(12) United States Patent
Watanabe et al.

(10) Patent No.: US 11,044,012 B2
(45) Date of Patent: Jun. 22, 2021

(54) INTER-MOBILE-BODY COMMUNICATION SYSTEM, INTER-MOBILE-BODY COMMUNICATION METHOD, AND PROGRAM RECORDING MEDIUM

(71) Applicant: NEC Corporation, Tokyo (JP)

(72) Inventors: Go Watanabe, Tokyo (JP); Satoshi Kyosuna, Tokyo (JP)

(73) Assignee: NEC CORPORATION, Tokyo (JP)

( * ) Notice: Subject to any disclaimer, the term of this patent is extended or adjusted under 35 U.S.C. 154(b) by 240 days.

(21) Appl. No.: 16/086,066

(22) PCT Filed: Mar. 17, 2017

(86) PCT No.: PCT/JP2017/010956
§ 371 (c)(1),
(2) Date: Sep. 18, 2018

(87) PCT Pub. No.: WO2017/169911
PCT Pub. Date: Oct. 5, 2017

(65) Prior Publication Data
US 2020/0295831 A1    Sep. 17, 2020

(30) Foreign Application Priority Data
Mar. 29, 2016  (JP) .............................. JP2016-065876

(51) Int. Cl.
*H04B 10/11* (2013.01)
*H04B 10/112* (2013.01)
(Continued)

(52) U.S. Cl.
CPC ....... *H04B 10/1123* (2013.01); *H04B 10/504* (2013.01); *H04W 4/40* (2018.02); *H04W 4/46* (2018.02); *H04B 10/11* (2013.01)

(58) Field of Classification Search
CPC .. H04B 10/1123; H04B 10/504; H04B 10/11; H04B 7/18504; H04B 7/18521; H04B 10/112; H04W 4/46; H04W 4/40
(Continued)

(56) References Cited

U.S. PATENT DOCUMENTS 5,594,580 A * 1/1997 Sakanaka ........... H04B 10/1125
                                                                398/122
9,319,133 B2 * 4/2016 Zhou ...................... H04B 10/11
(Continued)

FOREIGN PATENT DOCUMENTS

JP    H09-51309 A      2/1997
JP    2005-157873 A    6/2005
(Continued)

OTHER PUBLICATIONS

International Search Report for PCT Application No. PCT/JP2017/010956, dated Jun. 13, 2017.
(Continued)

*Primary Examiner* — Dibson J Sanchez

(57) ABSTRACT

In order to reliably communicate with a communication object even when a relative positional relationship with the communication object cannot be accurately recognized, an inter-mobile-body communication system includes: a control device which performs control of switching between a first mode of transmitting wide-area signal light, and a second mode of transmitting selective signal light toward a communication object in response to response signal light responding to the wide-area signal light transmitted in the first mode, and performs control of selectively receiving the response signal light from the communication object; and a light transmitting/receiving device which transmits the wide-area signal light in the first mode, transmits the selective signal light toward the communication object in the second mode, and selectively receives the response signal
(Continued)

light from the communication object, according to control by the control device.

10 Claims, 28 Drawing Sheets

(51) Int. Cl.
*H04W 4/40* (2018.01)
*H04W 4/46* (2018.01)
*H04B 10/50* (2013.01)

(58) Field of Classification Search
USPC .................................................. 398/118–131
See application file for complete search history.

(56) References Cited

U.S. PATENT DOCUMENTS

| | | | | |
|---|---|---|---|---|
| 2002/0196506 | A1* | 12/2002 | Graves | H04B 10/1125 398/126 |
| 2003/0043435 | A1* | 3/2003 | Oettinger | H04B 10/1149 398/129 |
| 2003/0053164 | A1* | 3/2003 | Stappaerts | H04B 10/1121 398/5 |
| 2004/0141753 | A1* | 7/2004 | Andreu-von Euw | H04B 10/1127 398/122 |
| 2005/0041980 | A1* | 2/2005 | Ueyanagi | H04B 10/1149 398/156 |
| 2008/0056723 | A1* | 3/2008 | Giles | H04B 10/118 398/118 |
| 2009/0252499 | A1* | 10/2009 | Rotgaizer | H04B 13/02 398/131 |
| 2013/0015984 | A1 | 1/2013 | Yamashiro | |
| 2013/0082162 | A1* | 4/2013 | Eide | H04B 10/1123 250/203.3 |
| 2014/0153928 | A1* | 6/2014 | Yu | H04B 10/1129 398/115 |
| 2015/0215040 | A1* | 7/2015 | Dickson | H04B 10/1125 398/131 |
| 2015/0349881 | A1* | 12/2015 | Byers | H04B 10/1123 398/38 |
| 2015/0349885 | A1 | 12/2015 | Endo | |
| 2016/0087722 | A1* | 3/2016 | Wabnig | H04B 10/1125 398/131 |
| 2016/0294472 | A1* | 10/2016 | Palmer | H04B 7/0617 |
| 2017/0257167 | A1* | 9/2017 | Adams | H01Q 5/22 |
| 2019/0253142 | A1* | 8/2019 | Griffith | H04B 10/112 |

FOREIGN PATENT DOCUMENTS

| | | |
|---|---|---|
| JP | 2010-258809 A | 11/2010 |
| JP | 2013-025423 | 2/2013 |
| JP | 2015-225558 A | 12/2015 |

OTHER PUBLICATIONS

English translation of Written opinion for PCT Application No. PCT/JP2017/010956, dated Jun. 13, 2017.

\* cited by examiner

Fig.2
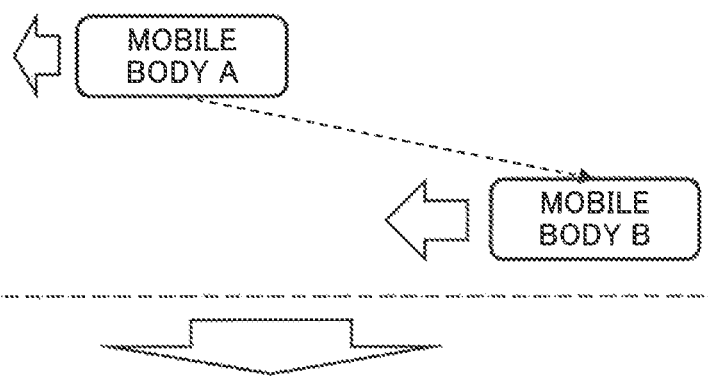
A BEFORE EMISSION
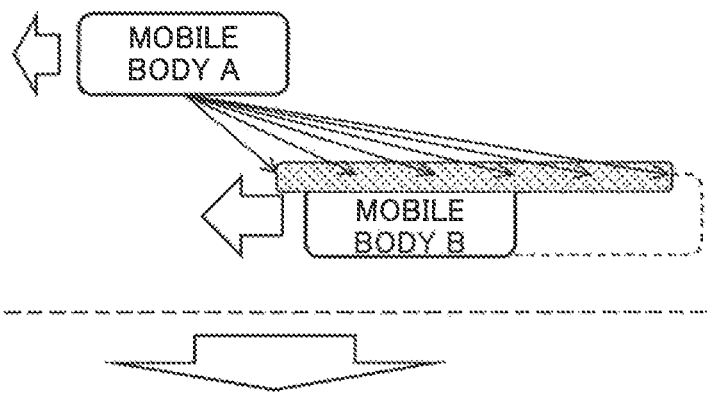
B SEARCH MODE
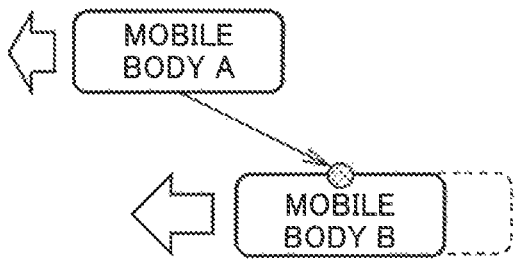
C TRACKING MODE Fig.11
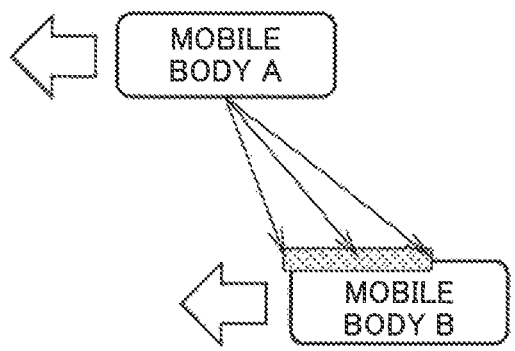
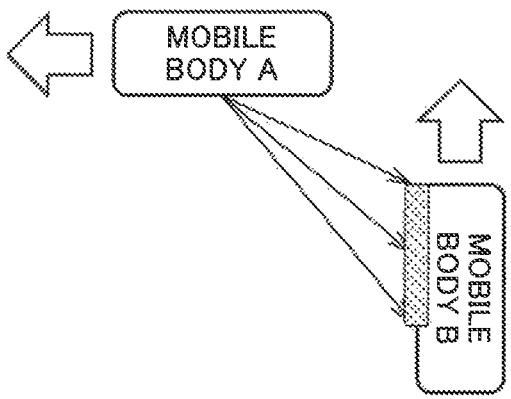

Fig.12
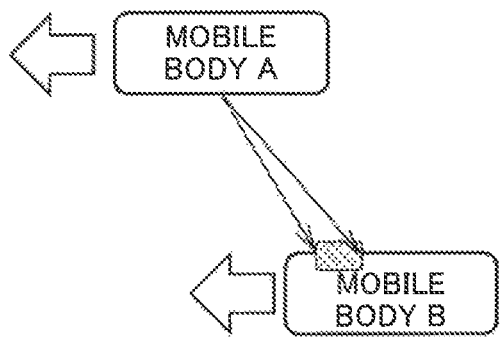
A RELATIVE SPEED DIFFERENCE IS SMALL
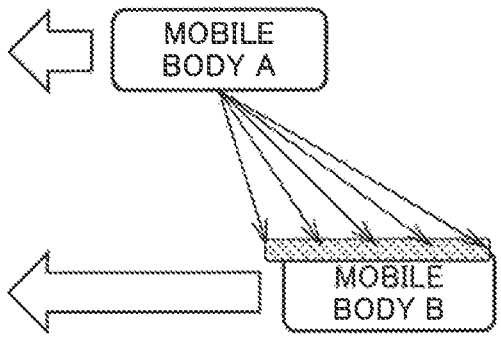
B RELATIVE SPEED DIFFERENCE IS GREAT

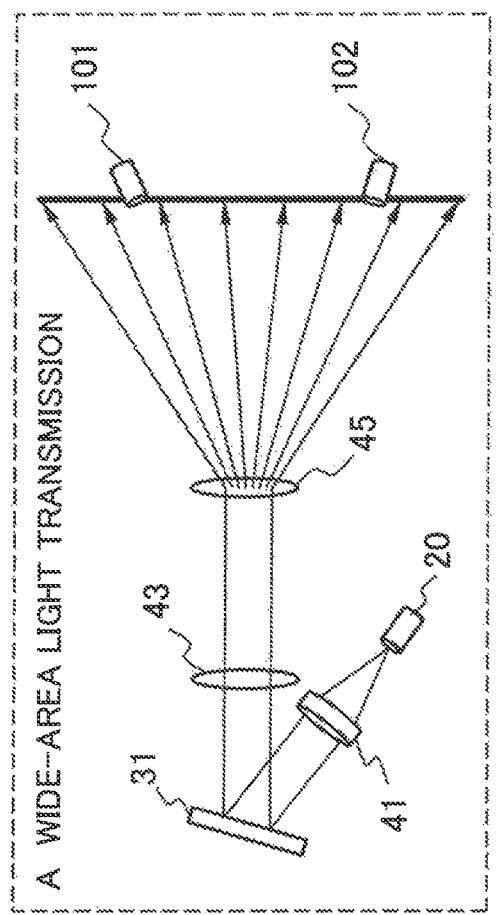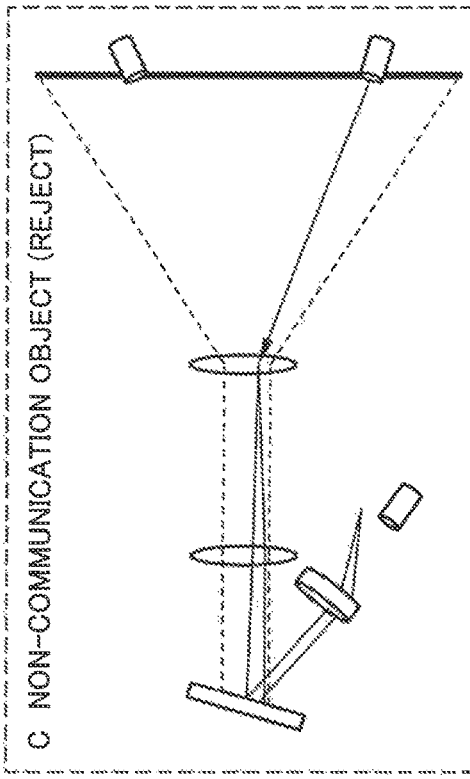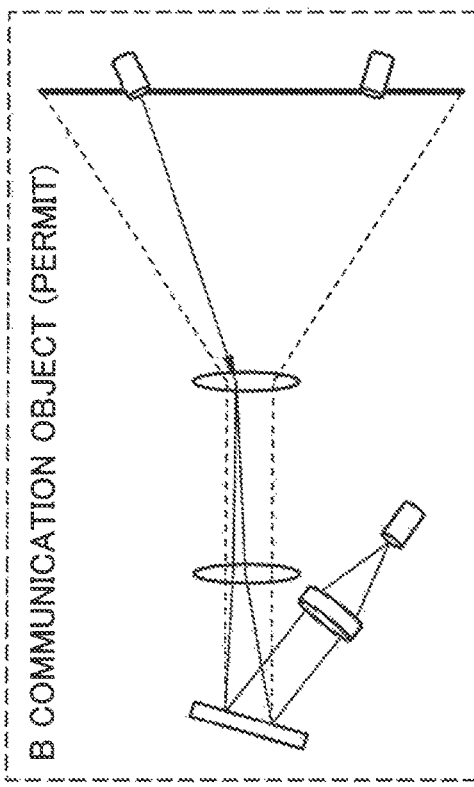
Fig.19

INTER-MOBILE-BODY COMMUNICATION SYSTEM, INTER-MOBILE-BODY COMMUNICATION METHOD, AND PROGRAM RECORDING MEDIUM

This application is a National Stage Entry of PCT/JP2017/010956 filed on Mar. 17, 2017, which claims priority from Japanese Patent Application 2016-065876 filed on Mar. 29, 2016, the contents of all of which are incorporated herein by reference, in their entirety.

TECHNICAL FIELD

The present invention relates to an inter-mobile-body communication system for communication between mobile bodies by using light, an inter-mobile-body communication method, and a program recording medium.

BACKGROUND ART

Inter-vehicle communication, which is one of inter-mobile-body communications, is a communication technique being intended for traffic safety and accident prevention and serving to support operation of a vehicle. In addition to inter-vehicle communication, inter-mobile-body communications include inter-satellite communication, inter-aircraft communication, inter-ship communication, pedestrian-to-vehicle communication, inter-pedestrian communication, and the like. In inter-vehicle communication, a local vehicle directly communicates with another vehicle, and acquires operation information and position information of the other vehicle, road information, and the like. Inter-vehicle communication is performed by, for example, wireless communication utilizing an electric wave on a particular frequency band, or wireless communication utilizing light.

PTL 1 describes one example of inter-vehicle communication performed by wireless communication utilizing an electric wave. PTL 1 discloses a vehicular wireless communication device which enables to perform tracking running while maintaining a predetermined inter-vehicle distance to a preceding vehicle by use of wireless communication. The vehicular wireless communication device in PTL 1 changes a transmission period of information transmitted from a local device by wireless communication, depending on whether or not a ranging sensor is mounted in a nearest subsequent vehicle, or whether or not detection is successful in a ranging sensor. The vehicular wireless communication device in PTL 1 sets a longer transmission period of transmitting current position information of the local vehicle when the current position information of the local vehicle is not needed frequently by the subsequent vehicle, and sets a shorter transmission period of transmitting the current position information of the local vehicle when the information is needed frequently.

According to the vehicular wireless communication device in PTL 1, it is possible to transmit information at a frequency that better meets necessity while making congestion more difficult to occur, when information is transmitted by inter-vehicle communication. However, the vehicular wireless communication device in PTL 1 uses wireless communication utilizing an electric wave, therefore sufficient information confidentiality cannot be obtained due to interception of communication.

PTL 2 describes one example of inter-vehicle communication performed by wireless communication utilizing light. PTL 2 discloses an inter-vehicle communication system which enables to reliably convey information owned by a particular vehicle to another vehicle by use of wireless communication utilizing light. The inter-vehicle communication system in PTL 2 includes a forward light projecting/receiving unit which transmits and receives a laser light signal to and from a forward vehicle, a backward light projecting/receiving unit which transmits and receives a laser light signal to and from a backward vehicle, and a signal relay means which relays a signal between the forward light projecting/receiving unit and the backward light projecting/receiving unit.

CITATION LIST

Patent Literature

[PTL 1] Japanese Unexamined Patent Application Publication No. 2013-25423
[PTL 2] Japanese Unexamined Patent Application Publication No. H9-51309

SUMMARY OF INVENTION

Technical Problem

According to PTL 2, communication is performed by use of laser light having high directivity. Therefore, a signal is not received by an unidentified object in contrast to wireless communication utilizing an electric wave, and it is possible to obtain confidentiality of communication. However, the inter-vehicle communication system in PTL 2 has a problem that it is sometimes difficult to properly perform communication due to interference of projected light when communicating with a plurality of mobile bodies. Moreover, the inter-vehicle communication system in PTL 2 has a problem that communication is interrupted in the case where a forward or backward vehicle comes out of a projection region of light when a relative positional relationship with a communication object is not accurately recognized.

In order to solve the problems described above, an object of the present invention is to provide an inter-mobile-body communication system which enables a reliable communication with a communication object even when a relative positional relationship with the communication object is not accurately recognized.

Solution to Problem

An inter-mobile-body communication system according to the present invention includes: a control device which performs control of switching between a first mode of transmitting wide-area signal light, and a second mode of transmitting selective signal light toward a communication object in response to response signal light responding to the wide-area signal light transmitted in the first mode, and performs control of selectively receiving the response signal light from the communication object; and a light transmitting/receiving device which transmits the wide-area signal light in the first mode, transmits the selective signal light toward the communication object in the second mode, and selectively receives the response signal light from the communication object, according to control by the control device.

An inter-mobile-body communication method according to the present invention includes: performing control of switching between a first mode of transmitting wide-area signal light, and a second mode of transmitting selective signal light toward a communication object in response to response signal light responding to the wide-area signal light transmitted in the first mode; transmitting the wide-area signal light in the first mode; transmitting the selective signal light toward the communication object in the second mode; and selectively receiving the response signal light from the communication object.

A program recording medium according to the present invention records an inter-mobile-body communication program which causes a computer to execute: processing of performing control of switching between a first mode of transmitting wide-area signal light, and a second mode of transmitting selective signal light toward a communication object in response to response signal light responding to the wide-area signal light transmitted in the first mode; processing of transmitting the wide-area signal light in the first mode; processing of transmitting the selective signal light toward the communication object in the second mode; and processing of selectively receiving the response signal light from the communication object.

Advantageous Effects of Invention

According to the present invention, it is possible to provide an inter-mobile-body communication system which enables a reliable communication with a communication object even when a relative positional relationship with the communication object is not accurately recognized.

BRIEF DESCRIPTION OF DRAWINGS

FIG. 2 is a conceptual diagram of an example in which signal light is emitted to a communication object from a mobile body equipped with the inter-mobile-body communication system according to the first example embodiment of the present invention.

FIG. 11 is a conceptual diagram of an example in which signal light is emitted to a communication object from a mobile body equipped with the inter-mobile-body communication system according to the first example embodiment of the present invention.

FIG. 12 is a conceptual diagram of an example in which signal light is emitted to a communication object from a mobile body equipped with the inter-mobile-body communication system according to the first example embodiment of the present invention.

FIG. 19 is a conceptual diagram illustrating one example of selective reception of signal light by the inter-mobile-body communication system according to the second example embodiment of the present invention.

EXAMPLE EMBODIMENT

Figure 1:
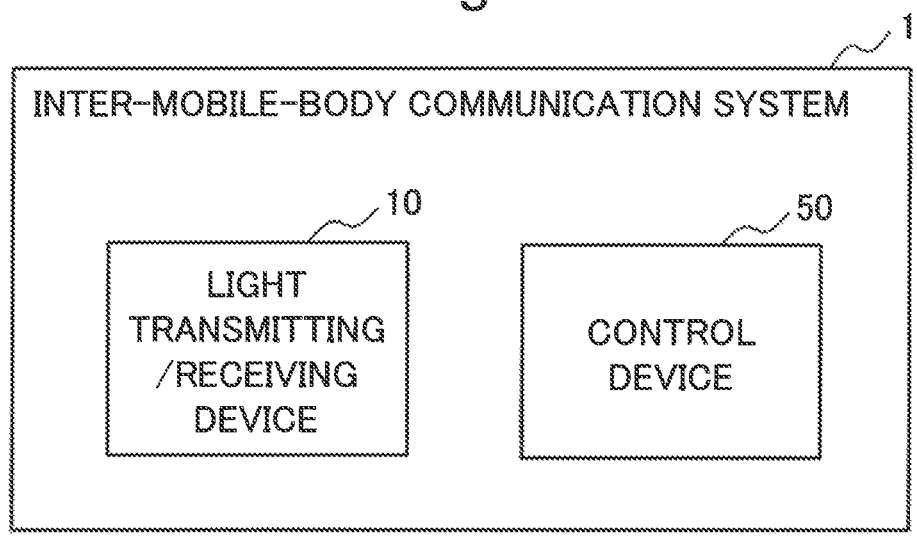
FIG. 1 is a block diagram illustrating a configuration of an inter-mobile-body communication system according to a first example embodiment of the present invention.

Hereinafter, a mode for carrying out the present invention is described with reference to the drawings. Incidentally, example embodiments described below are technically preferably limited for implementation of the present invention, but the scope of the invention is not limited to the following. Note that, unless there is some particular reason, the same reference signs are given to similar parts in all the drawings used for the following description of the example embodiments. Moreover, in the following example embodiments, a repeated description is omitted in regard to a similar configuration and operation in some cases. In addition, a direction of an arrow in the drawings indicates one example, and does not limit a direction of a signal between blocks.

First Example Embodiment (Configuration)

First, a configuration of an inter-mobile-body communication system 1 according to a first example embodiment of the present invention is described with reference to the drawings.

FIG. 1 is a block diagram illustrating the configuration of the inter-mobile-body communication system 1 according to the present example embodiment. As illustrated in FIG. 1, the inter-mobile-body communication system 1 according to the present example embodiment includes a light transmitting/receiving device 10 and a control device 50. The inter-mobile-body communication system 1 is a system mounted in a mobile body such as a vehicle and serving for communication between mobile bodies. The inter-mobile-body communication system 1 is a system which performs intercommunication by mutually transmitting and receiving light (signal light) for communication with another mobile body being a communication object.

Although the inter-mobile-body communication system 1 is preferably mounted in the other mobile body as well, it is only necessary to be able to communicate with another system mounted in the other mobile body as well. For example, the inter-mobile-body communication system 1 needs only to be configured to perform intercommunication by mutually transmitting and receiving standardized signal light. However, this does not hold true when the inter-mobile-body communication system 1 is not compatible with another system.

The light transmitting/receiving device 10 is a device serving to transmit and receive signal light for communication with another mobile body being a communication object. The light transmitting/receiving device 10 includes a light source and a light receiver. The light transmitting/receiving device 10 deforms an emission shape of light (emanation light) emanated from the light source into signal light, and then transmits the light as signal light in any direction. The light transmitting/receiving device 10 also receives signal light from another mobile body.

For example, when a spatial light modulation element is applied to the light transmitting/receiving device 10, the light transmitting/receiving device 10 is able to be configured to transmit light reflected by a display unit of the spatial light modulation element as signal light. In this case, the light transmitting/receiving device 10 is able to transmit signal light in various emission shapes or emission ranges in any direction by changing a pattern displayed on the display unit of the spatial light modulation element. In other words, the light transmitting/receiving device 10 is able to transmit any signal light in any direction without a mechanical operation mechanism provided therein. Note that, hereinafter, an emission range of signal light is also included in one aspect of an emission shape of the signal light.

Furthermore, the light transmitting/receiving device 10 selectively guides signal light from a mobile body being a communication object to the light receiver. For example, the light transmitting/receiving device 10 including a spatial light modulation element is able to selectively guide signal light from a particular communication object to the light receiver when the spatial light modulation element is controlled in such a way as to communicate with the particular communication object. In this instance, signal light from another mobile body (hereinafter, a non-communication object) being not a communication object is guided in a direction different from the light receiver, and is thus not received by the light receiver.

The light source emanates light. The light receiver receives light. The light source includes, for example, a laser light source which emanates light having high directivity, or a light emitting diode (LED). Particularly, it is preferable to use a laser light source for the light source. A photodiode, or an element such as a complementary metal-oxide-semiconductor (CMOS) or a charge coupled device (CCD) is applicable to the light receiver. Note that the light source and the light receiver are arranged in such a way that an emanation part of the light source and a light receiving position of the light receiver are close to each other.

The control device 50 performs control that causes the light transmitting/receiving device 10 to transmit signal light. The control device 50 sets a direction in which signal light is transmitted, and sets an emission shape or an emission range of transmitted signal light. Moreover, the control device 50 identifies a communication object or calculates a position of a communication object on the basis of signal light received by the light transmitting/receiving device 10. Further, the control device 50 modulates and demodulates signal light transmitted to and received from a communication object.

The control device 50 performs control that switches between two modes.

A first mode is a search mode in which signal light is transmitted over a wide area. Note that wide-area signal light transmitted in the first mode is also referred to as wide-area signal light.

A second mode is a tracking mode in which signal light is selectively transmitted toward a communication object in response to a response from the communication object to the signal light transmitted in the search mode. Note that signal light including a response to wide-area signal light is also referred to as response signal light. Moreover, signal light selectively transmitted toward a communication object in the second mode is also referred to as selective signal light.

In the search mode, the control device 50 controls the light transmitting/receiving device 10 in such a way as to transmit, over a wide area toward a communication object, signal light including information such as position information or speed information of a transmission-side mobile body, operation information, a position of the light receiver, and a light transmission time. Moreover, in the tracking mode, the control device 50 controls in such a way as to change an emission range or an emission shape of signal light and selectively transmit pinpoint signal light toward a communication object.

For example, position information needs only to be acquired in cooperation with a global positioning system (GPS) or a navigation system. Speed information needs only to be acquired from a speedometer or the like of a mobile body. Operation information needs only to be acquired from a navigation system. A position of the light receiver needs only to be set as information about a position relative to a gravity center or a characteristic point of a mobile body.

FIG. 2 is one example of a scene where signal light is transmitted from a mobile body A equipped with the inter-mobile-body communication system 1 toward a mobile body B being a communication object. Note that, in the following description, not the inter-mobile-body communication system 1 but the mobile body A and the mobile body B equipped with the inter-mobile-body communication systems 1 are mainly described.

It is assumed that a rough position of the mobile body B is known to the mobile body A before emission of signal light (a scene A in an upper stage of FIG. 2). However, because alignment with the light receiver of the mobile body B is not accurately performed, signal light may come out of the light receiving unit of the mobile body B when emitted to the mobile body B from the mobile body A with a small spot.

First, in the search mode (a scene B in a middle stage of FIG. 2), the mobile body A transmits signal light over a wide area toward a position including the mobile body B. The search mode is a mode for alignment of the mobile body A with the mobile body B being a communication object. Note that the mobile body A may communicate with the mobile body B by wide light transmission in the search mode.

The mobile body A transmits, over a wide area toward the mobile body B, signal light including information such as a light transmission time, position information, speed information, operation information, and a position of the light receiving unit (search mode). The mobile body B acquires information such as the light transmission time, the position information, the speed information, the operation information, and the position of the light receiving unit of the mobile body A by receiving wide-area signal light.

The mobile body B calculates a position of the mobile body A on the basis of the signal light from the mobile body A, and transmits signal light toward the light receiver of the mobile body A. The mobile body B transmits, toward the mobile body A, signal light including information such as a light transmission time, position information, speed information, operation information, and a position of the light receiver. In this instance, the mobile body B may transmit wide-area signal light toward the mobile body A, or selectively transmit spot-shaped selective signal light toward the light receiving unit of the mobile body A. The mobile body A acquires information about the mobile body B by the signal light received from the mobile body B.

Next, in a tracking mode (a scene C in a lower stage of FIG. 2), the mobile body A transmits spot-shaped selective signal light toward the light receiver of the mobile body B. The tracking mode is a mode that continues an environment in which the mobile body A and the mobile body B communicate with each other while mutually recognizing a positional relationship thereof. In the tracking mode, the mobile body A changes an emission range or an emission shape of signal light, and transmits pinpoint signal light toward the light receiver of the mobile body B.

As in FIG. 2, according to the present example embodiment, it is possible to search for a communication object in a search mode, and communicate with the communication object in a tracking mode.

Incidentally, although signal light is transmitted and received on one side surface of a mobile body in the example illustrated in FIG. 2, a place where signal light is transmitted and received is not limited to one side surface of a mobile body. Actually, location of a communication object around a mobile body cannot necessarily be recognized, and it is therefore preferable to provide a plurality of places where signal light is transmitted and received. For example, it is easier to search for mobile bodies located around, with a configuration in which signal light is transmitted and received in places including a front, a rear, both side surfaces, corners and the like of a mobile body.

When signal light is mutually transmitted and received on front and rear sides of a mobile body, at least one light transmission and reception place may be provided in each of the front and rear parts of the mobile body. When signal light is mutually transmitted and received on lateral sides of a mobile body as well, at least one light transmission and reception place may be provided in each of the front, rear, and both side parts of the mobile body. Alternatively, a light transmission and reception place may be provided in at least one of four corners of a mobile body. When a light transmission and reception place is provided on an outer side of a ceiling of a mobile body, it is also possible to cover four sides by one light transmission and reception place.

In this way, when light is transmitted over a wide area toward periphery from a plurality of light transmission and reception places, it is possible to search for a communication object a position of which has not been assumed. In this case, the control device 50 needs only to control selective light transmission in a light transmission and reception place where a response from a communication object is received.

Figure 3:
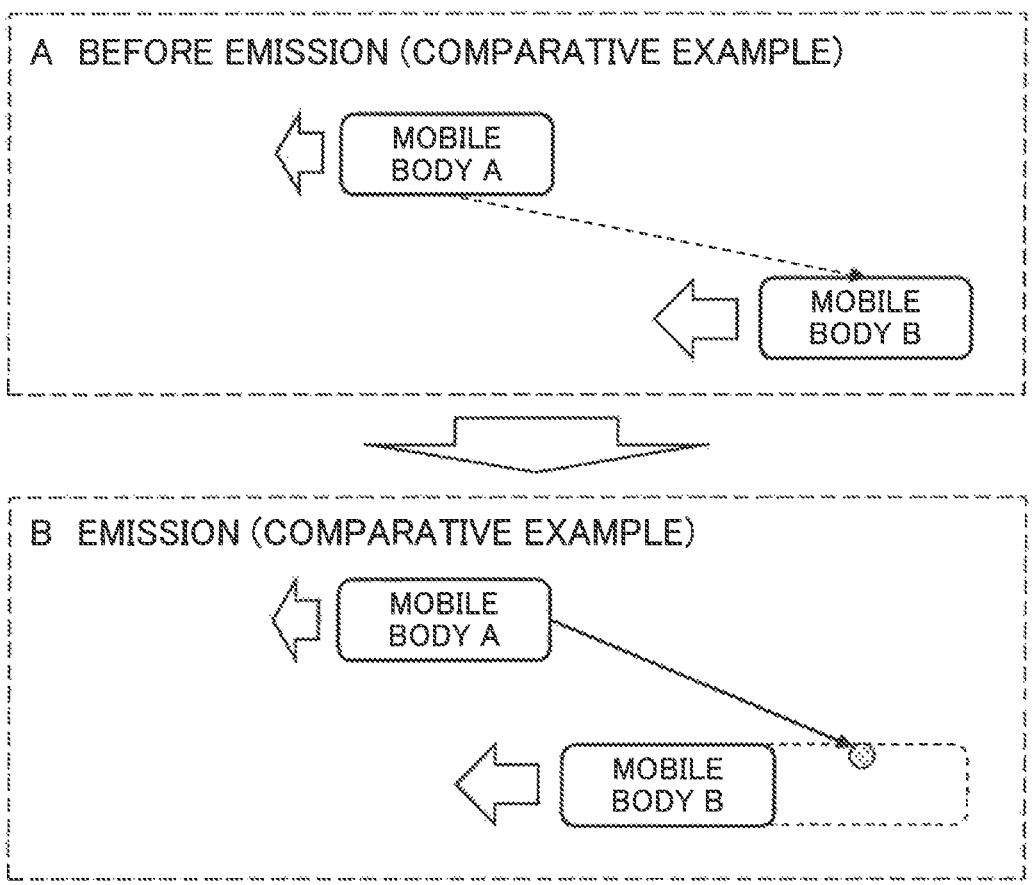
FIG. 3 is a conceptual diagram of a communication between mobile bodies equipped with a general inter-mobile-body communication system.

Herein, transmission and reception of signal light between mobile bodies when the search mode is not used are described with reference to FIG. 3. For example, when the mobile body A transmits pinpoint signal light toward the light receiver of the mobile body B in a positional relationship as in an upper stage of FIG. 3, the signal light is emitted to a position out of the light receiver of the mobile body B, and there is a possibility that the signal light is not received by the mobile body B as in a lower stage of FIG. 3. Particularly, when a speed difference between the mobile body A and the mobile body B is great, it is difficult to recognize mutual positional relationship.

On the other hand, in a scheme according to the present example embodiment as in FIG. 2, signal light is transmitted in the search mode in such a way that the whole mobile body B is included, whereas signal light is transmitted toward the light receiver of the mobile body B in the tracking mode. Thus, according to the present example embodiment, light transmitting/receiving units are aligned between mobile bodies by use of signal light in the search mode, and on the basis of the result of the alignment, the mobile bodies are able to communicate with each other in the tracking mode.

Next, a detailed configuration of the inter-mobile-body communication system 1 according to the present example embodiment is described with reference to the drawings.

[Light Transmitting/Receiving Device]

Figure 4:
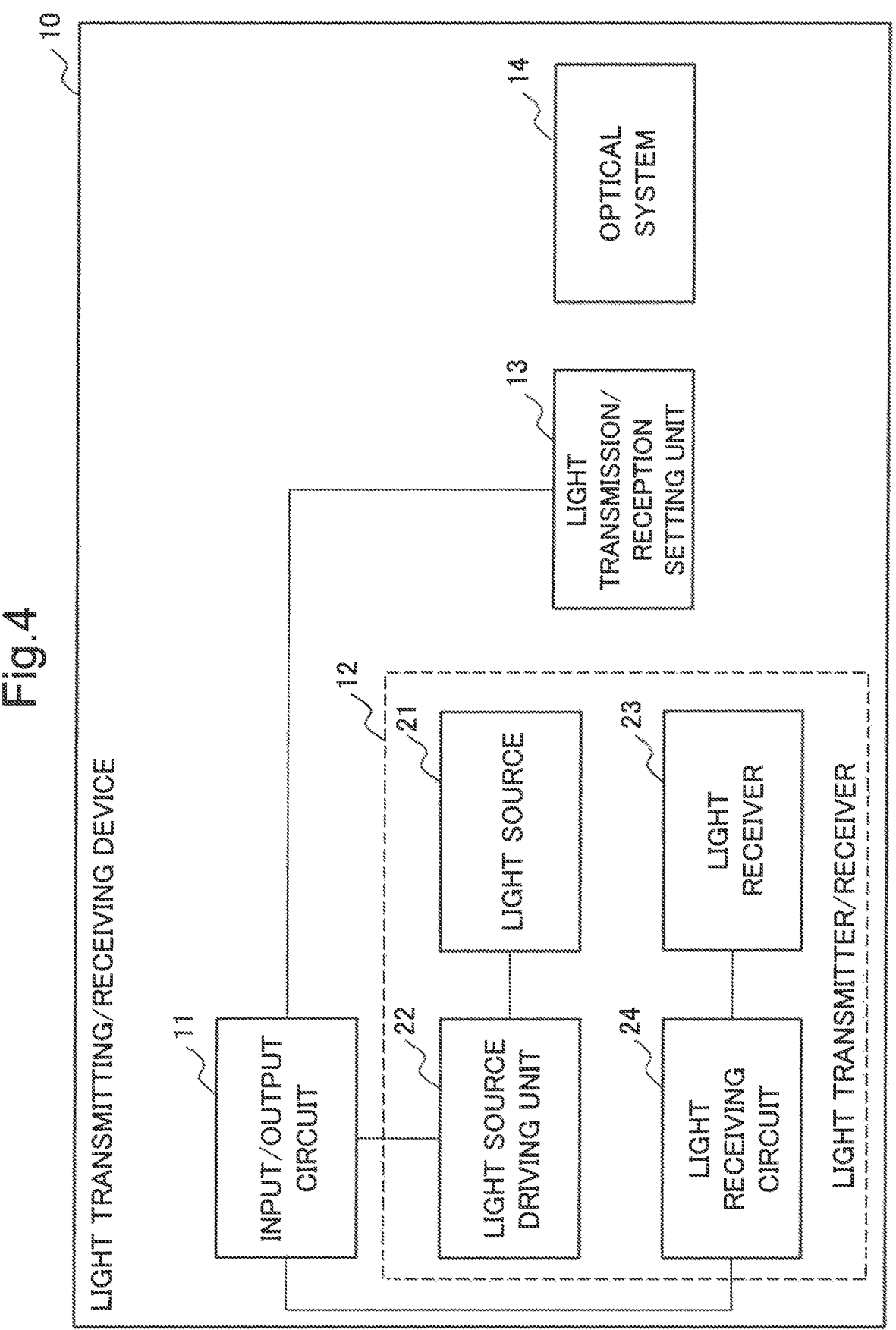
FIG. 4 is a block diagram illustrating a configuration of a light transmitting/receiving device of the inter-mobile-body communication system according to the first example embodiment of the present invention.

FIG. 4 is a block diagram illustrating a configuration of the light transmitting/receiving device 10. As in FIG. 4, the light transmitting/receiving device 10 includes an input/output circuit 11, a light transmitter/receiver 12, a light transmission/reception setting unit 13, and an optical system 14.

The input/output circuit 11 is an interface circuit for exchanging data with the control device 50.

The light transmitter/receiver 12 transmits/receives an optical signal. The light transmitter/receiver 12 transmits signal light corresponding to control by the control device 50. The light transmitter/receiver 12 also receives signal light from a communication object, and converts the received signal light into an electric signal. For example, the light transmitter/receiver 12 reflects and thus transmits signal light emitted to the display unit of the spatial light modulation element, and receives light resulting from reflection of reflected light of the transmitted signal light on the display unit of the spatial light modulation element. Note that a configuration of the light transmitter/receiver 12 will be described later.

The light transmission/reception setting unit 13 sets an emission shape, an emission range, and a light transmission direction of transmitted signal light according to control by the control device 50, and emanates signal light on the basis of the setting. For example, the light transmission/reception setting unit 13 sets an emission shape, an emission range, and a light transmission direction of transmitted signal light by controlling a display pattern displayed on the display unit of the spatial light modulation element. Moreover, the light transmission/reception setting unit 13 guides signal light received from a communication object toward the light receiver, and guides signal light received from a non-communication object out of the light receiver. For example, the light transmission/reception setting unit 13 controls in such a way as to guide signal light from a communication object toward the light receiver and guide signal light from a non-communication object out of the light receiver, by controlling a display pattern displayed on the display unit of the spatial light modulation element. For example, the light transmission/reception setting unit 13 controls in such a way as to bring signal light from a non-communication object out of the light receiver, by displaying, on the display unit of the spatial light modulation element, a non-reflective display pattern, or a display pattern which guides signal light to a position out of the light receiver.

The optical system 14 doubles as a projection optical system which projects light emanated by the light transmission/reception setting unit 13 toward a communication object as signal light, and a light receiving optical system which guides received signal light to the light receiver according to an object.

Furthermore, the light transmitter/receiver 12 includes a light source 21, a light source driving unit 22, a light receiver 23, and a light receiving circuit 24.

The light source 21 emanates light having a particular wavelength as driven by the light source driving unit 22. The light emanated from the light source 21 is preferably coherent light having uniform phase. For example, a laser light source can be used for the light source 21. The laser light emanated from the light source 21 is preferably formed into parallel light by a collimator (not illustrated).

The light source 21 is configured to emanate light in an invisible infrared region. Note that the light source 21 may be configured to emanate light in a visible region, or an ultraviolet region or the like other than an infrared region. In some cases, the light source 21 may emanate light other than laser light by use of a light emitting diode, an incandescent lamp, a discharge tube, or the like.

The light source driving unit 22 includes a power source which causes light to be emanated from the light source 21 by driving the light source 21 according to control by the control device 50.

The light receiver 23 is a photodetector which detects signal light received from a communication object. The light receiver 23 converts the received signal light into an electric signal. For example, a photodiode, a phototransistor, a photoconductive cell, an image sensor, a thermocouple for radiation, a thermopile, a pyroelectric detector, a photoelectric tube, a photomultiplier tube, or the like may be used for the light receiver 23.

The light receiving circuit 24 is a circuit which converts, into a digital signal, the electric signal converted from the signal light by the light receiver 23, decodes the digital signal, and then transmits the decoded signal to the control device 50.

Figure 5:
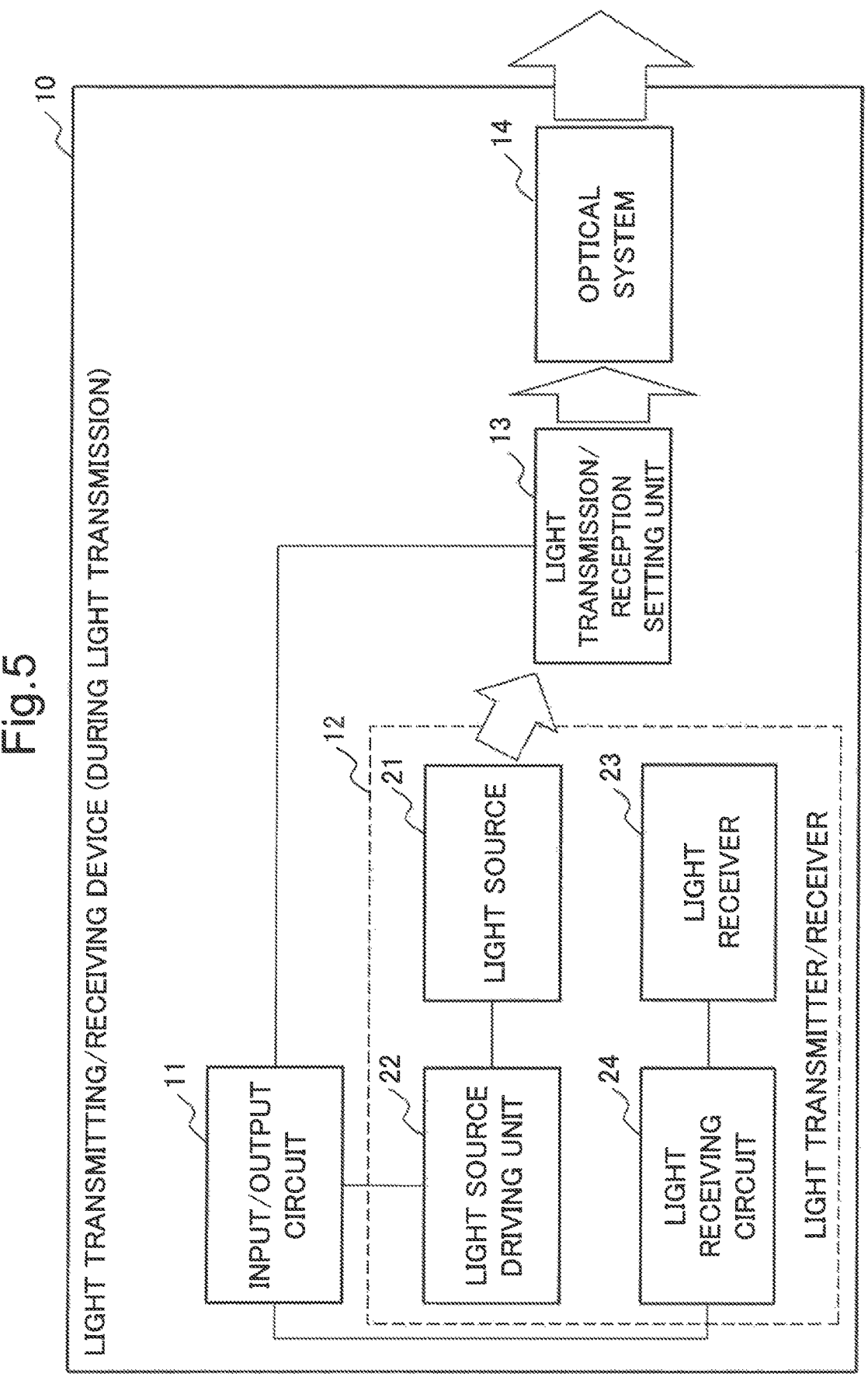
FIG. 5 is a conceptual diagram regarding transmission of signal light by the light transmitting/receiving device of the inter-mobile-body communication system according to the first example embodiment of the present invention.

FIG. 5 is a conceptual diagram regarding light transmission by the light transmitting/receiving device 10. During light transmission, the light transmitting/receiving device 10 converts light emanated from the light source 21 into emanation light by the light transmission/reception setting unit 13, and transmits the emanation light via the optical system 14.

Figure 6:
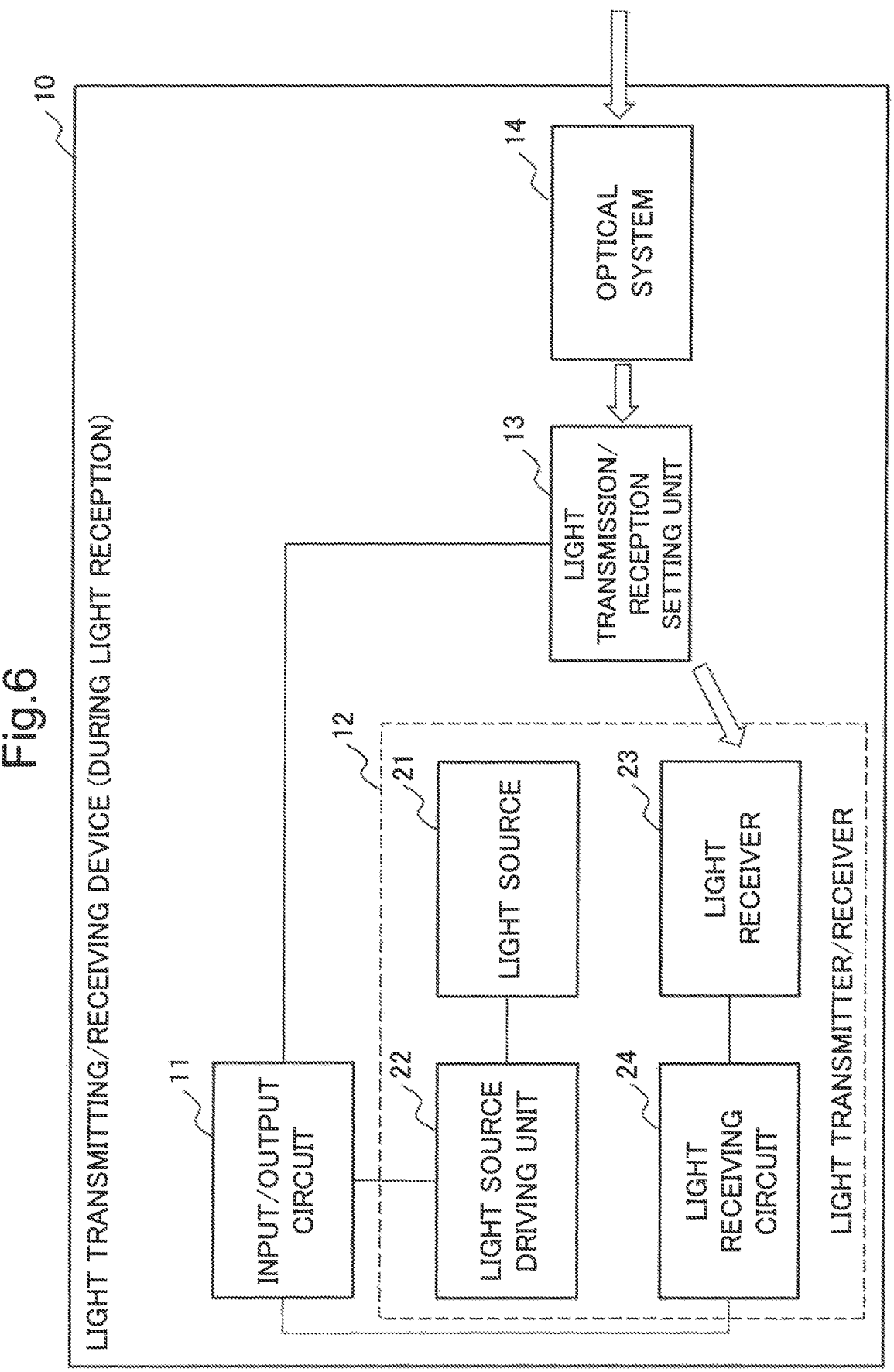
FIG. 6 is a conceptual diagram regarding reception of signal light by the light transmitting/receiving device of the inter-mobile-body communication system according to the first example embodiment of the present invention.

FIG. 6 is a conceptual diagram regarding reception of signal light by the light transmitting/receiving device 10. During reception of signal light, the light transmitting/receiving device 10 guides the light introduced via the optical system 14 to the light receiver 23 by controlling the light transmission/reception setting unit 13. Note that the light transmitting/receiving device 10 guides signal light from a non-communication object out of the light receiver 23 by controlling the light transmission/reception setting unit 13.

[Control Device]

Figure 7:
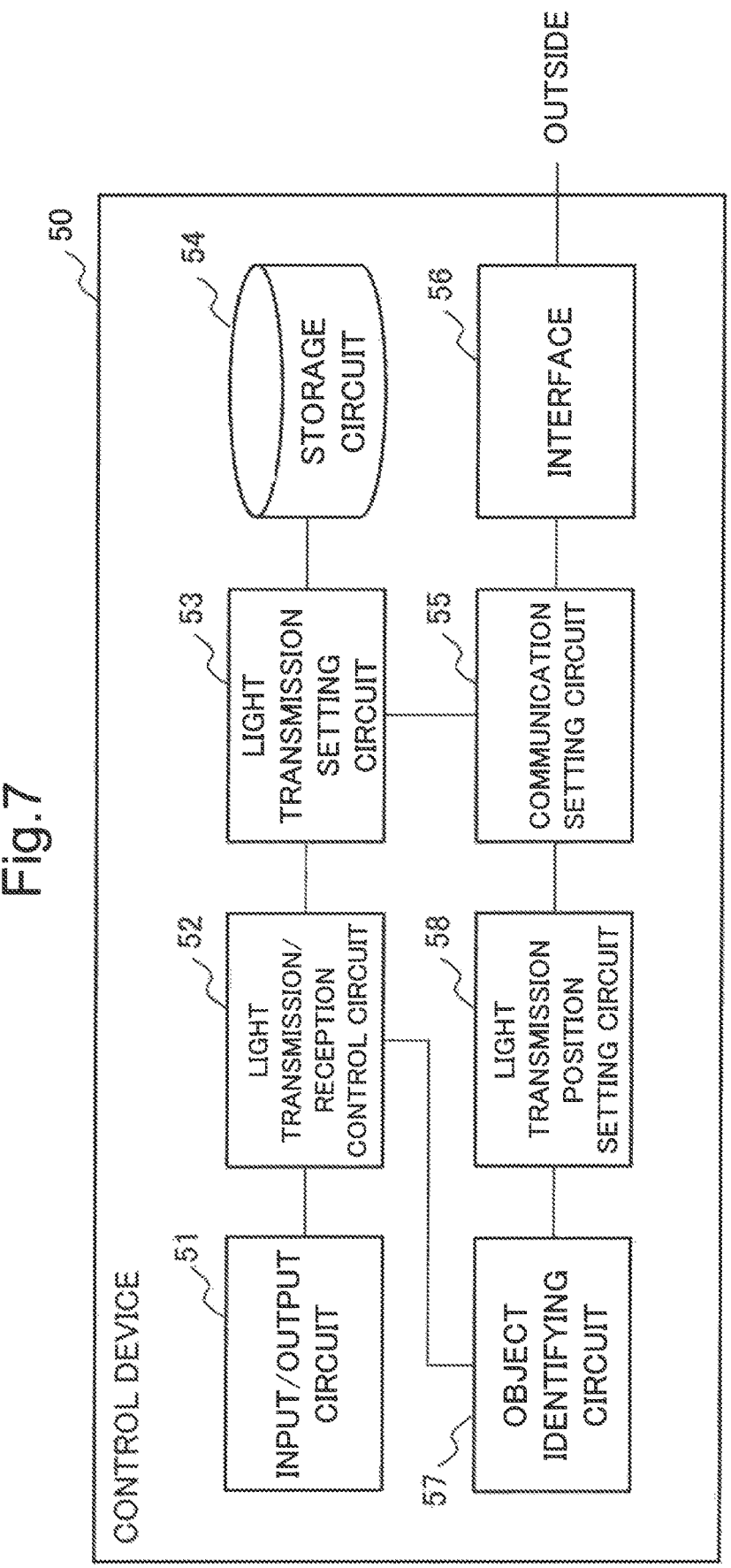
FIG. 7 is a block diagram illustrating a configuration of a control device of the inter-mobile-body communication system according to the first example embodiment of the present invention.

FIG. 7 is a block diagram illustrating a configuration of the control device 50. As illustrated in FIG. 7, the control device 50 includes an input/output circuit 51, a light transmission/reception control circuit 52, a light transmission setting circuit 53, a storage circuit 54, a communication setting circuit 55, an interface 56, an object identifying circuit 57, and a light transmission position setting circuit 58.

The input/output circuit 51 is an interface circuit for input and output of data to and from the light transmitting/receiving device 10.

The light transmission/reception control circuit 52 is a control circuit which controls the light source driving unit 22 and the light transmission/reception setting unit 13 of the light transmitting/receiving device 10 on the basis of a control condition set by the light transmission setting circuit 53.

The light transmission setting circuit 53 sets a control condition for the light transmitting/receiving device 10. The light transmission/reception control circuit 52 sets a control condition for transmission of signal light based on external information acquired via the interface 56 and the like toward a position set by the light transmission position setting circuit 58. The control condition set by the light transmission setting circuit 53 includes a light source driving condition for driving of the light source 21 at a light transmission timing of signal light, and a light transmission control condition for control of an emission shape or a light transmission direction of signal light transmitted in accordance with the light transmission timing. The light transmission setting circuit 53 incorporates communication information exchanged with a communication object into signal light by controlling a driving timing of the light source 21 in a pulse state in accordance with the communication information exchanged with the communication object.

The control condition set by the light transmission setting circuit 53 is output to the light transmitting/receiving device 10. Specifically, the light source driving condition is output to the light source driving unit 22, and the light transmission control condition is output to the light transmission/reception setting unit 13.

For example, when signal light is transmitted in the search mode, the light transmission setting circuit 53 sets such a control condition that signal light having an emission shape covering a wide area including the communication object is transmitted. When signal light is transmitted in the tracking mode, the light transmission setting circuit 53 sets such a control condition that spot-shaped signal light is transmitted toward the light receiver of the communication object.

The light transmission setting circuit 53 sets an emission shape of signal light by use of data stored in the storage circuit 54. When the light transmission/reception setting unit 13 includes a phase modulation type spatial light modulation element, the light transmission setting circuit 53 sets a light transmission control condition in the following procedure. First, the light transmission setting circuit 53 acquires a phase distribution corresponding to signal light having a desired emission shape from the storage circuit 54. When an emission range of signal light is altered, the light transmission setting circuit 53 alters an emission range of transmitted signal light to a desired range by processing the phase distribution. When a light transmission direction of signal light is altered, the light transmission setting circuit 53 alters a light transmission direction of transmitted light to a desired direction by processing the phase distribution. The light transmission setting circuit 53 needs only to set a light transmission control condition in which a phase distribution altered in such a way that signal light having a desired emission shape or emission range is transmitted in a desired direction corresponds to a timing at which the phase distribution is displayed on the display unit of the spatial light modulation element.

The storage circuit 54 is a storage unit serving to store data for control of the light transmitting/receiving device 10.

When the light transmission/reception setting unit 13 includes a phase modulation type spatial light modulation element, a phase distribution to be displayed on the display unit of the spatial light modulation element needs only to be stored in the storage circuit 54 in accordance with signal light having a desired emission shape. For example, when elongated rectangular signal light is transmitted, a phase distribution for forming elongated rectangular signal light needs only to be stored in the storage circuit 54. For example, when circular signal light is transmitted, a phase distribution for forming circular signal light needs only to be stored in the storage circuit 54.

The communication setting circuit 55 is a circuit that sets what signal light to transmit toward which communication object, and such. The communication setting circuit 55 acquires communication information from the outside to be transmitted to a communication object via the interface 56.

Moreover, the communication setting circuit 55 acquires, from the light transmission position setting circuit 58, a position for light transmission to the communication object. Then, the communication setting circuit 55 outputs the communication information to be transmitted to the communication object and the light transmission position of the communication object, to the light transmission setting circuit 53 in association with each other.

The interface 56 is an input/output unit which exchanges information with the outside. The interface 56 accepts information such as communication information transmitted to a communication object from the outside.

The object identifying circuit 57 is a circuit which identifies the object which has transmitted signal light as a communication object or a non-communication object, from the signal light received by the light receiver 23. For example, when an identifier (ID) of a light transmission source of signal light is included in the signal light, an object can be identified by use of the ID. When identifying the object which has emanated the signal as a communication object, the object identifying circuit 57 outputs an ID of the communication object to the light transmission position setting circuit 58. Alternatively, when identifying the object which has emanated the signal as a non-communication object, the object identifying circuit 57 outputs an ID of the non-communication object to the light transmission position setting circuit 58.

When a communication object is identified by the object identifying circuit 57, the light transmission position setting circuit 58 calculates a relative positional relationship with the communication object on the basis of the signal light transmitted by the communication object, and sets a light transmission position of communication light. The light transmission position setting circuit 58 outputs the calculated light transmission position to the communication setting circuit 55.

When the object which has emanated the signal is a non-communication object, the object identifying circuit 57 outputs an ID of the non-communication object to the light transmission setting circuit 53 via the communication setting circuit 55.

Herein, hardware (a control substrate 70) which achieves a control system of the inter-mobile-body communication system 1 according to the present example embodiment is described with reference to FIG. 8. Note that the control substrate 70 is one example of achieving the inter-mobile-body communication system 1, and does not limit the scope of the present invention. In addition, the control substrate 70 may be a single substrate, or may be divided into a plurality of substrates.

Figure 8:
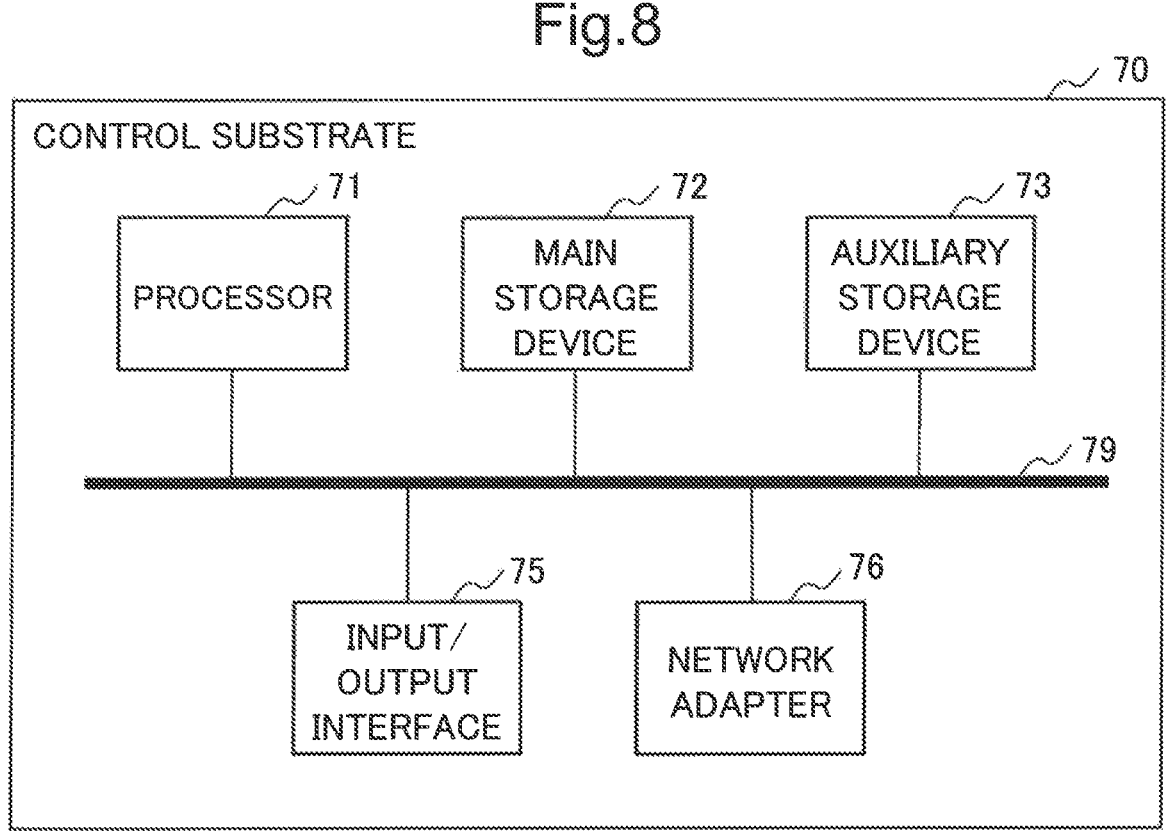
FIG. 8 is a block diagram illustrating a configuration example of a control system of the inter-mobile-body communication system according to the first example embodiment of the present invention.

As in FIG. 8, the control substrate 70 includes a processor 71, a main storage device 72, an auxiliary storage device 73, an input/output interface 75, and a network adapter 76. The processor 71, the main storage device 72, the auxiliary storage device 73, the input/output interface 75, and the network adapter 76 are interconnected via a bus 79. Moreover, the processor 71, the main storage device 72, the auxiliary storage device 73, and the input/output interface 75 are connected to a network such as an intranet or the Internet via the network adapter 76. The control substrate 70 is connected to another system, device, or sensor via a network. Moreover, the control substrate 70 may be connected to an upper system or a server via a wireless network. Note that the control substrate 70 may include a single component or a plurality of components.

The processor 71 is a central processing unit which expands, in the main storage device 72, a program stored in the auxiliary storage device 73 or the like, and executes the expanded program. In the present example embodiment, the processor 71 needs only to be configured to use a software program installed in the control substrate 70. The processor 71 executes computational processing or control processing by the control device 50.

The main storage device 72 has a region where a program is expanded. The main storage device 72 needs only to be a volatile memory such as a dynamic random access memory (DRAM). Alternatively, a nonvolatile memory such as a magnetoresistive random access memory (MRAM) may be configured or added as the main storage device 72.

The auxiliary storage device 73 is a means for storing data such as a display pattern. The auxiliary storage device 73 is configured as a local disk such as a hard disk or a flash memory. Note that the main storage device 72 may be configured to store data, and the auxiliary storage device 73 may be omitted.

The input/output interface 75 is an interface (I/F) which connects the control substrate 70 and a peripheral equipment on the basis of a connection standard.

The control substrate 70 may be configured in such a way that input equipment such as a keyboard, a mouse, or a touch panel may be connected thereto when necessary. The input equipment is used for input of information and setting. Note that, when a touch panel is used as input equipment, the touch panel needs only to be a touch panel display in which a display screen of display equipment doubles as an interface of the input equipment. Data may be exchanged between the processor 71 and the input equipment through the input/output interface 75.

The network adapter 76 is an interface for connection to a network such as the Internet or an intranet on the basis of a standard or a specification. The input/output interface 75 and the network adapter 76 may be formed as a common interface which is connected to external equipment.

(Operation)

Next, an operation of the inter-mobile-body communication system 1 according to the present example embodiment is described with reference to a flowchart in FIG. 9. Note that the operation in FIG. 9 is one example, and does not limit the scope of the present invention.

Figure 9:
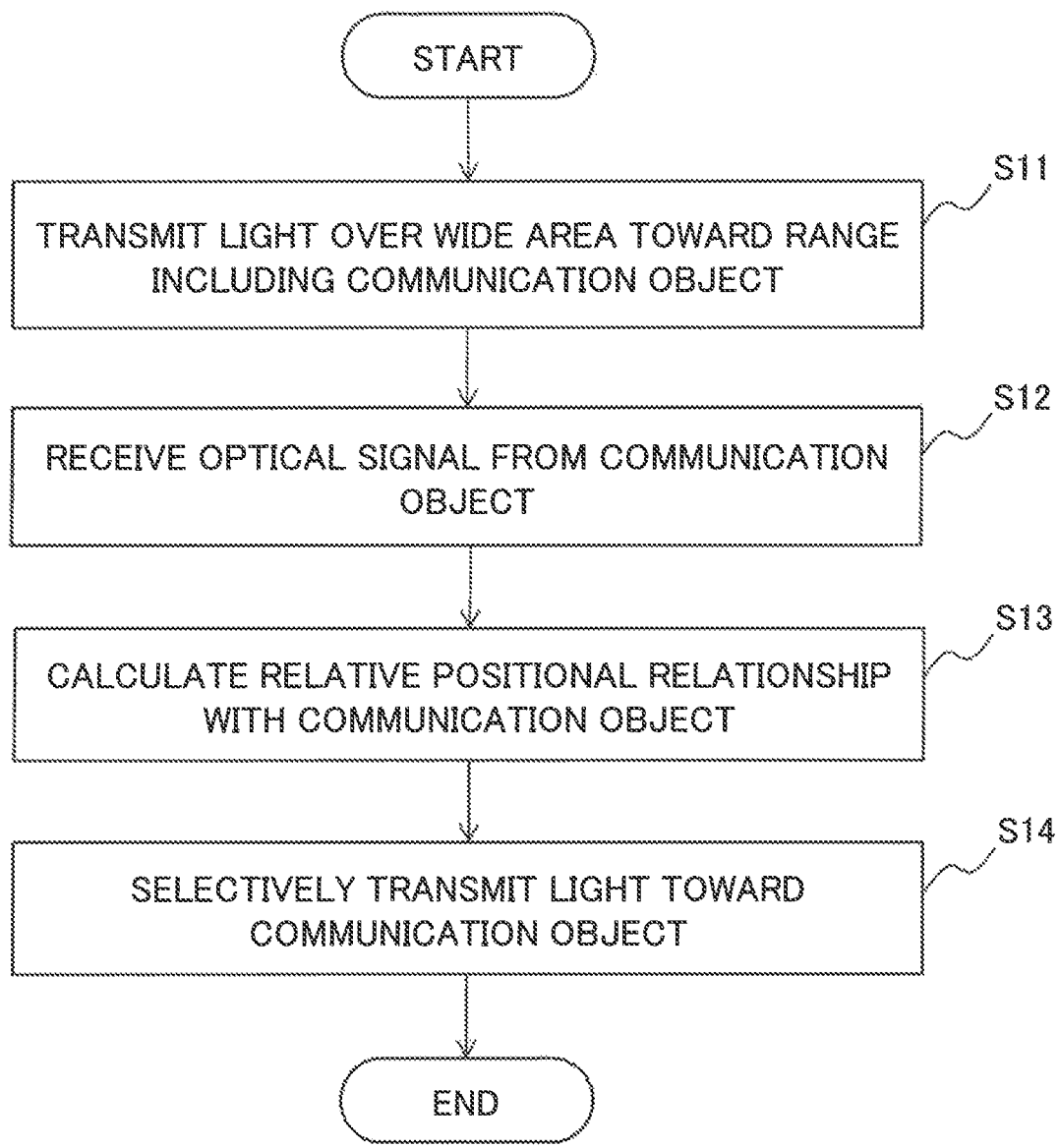
FIG. 9 is a flowchart regarding an operation of the inter-mobile-body communication system according to the first example embodiment of the present invention.

In FIG. 9, first, the light transmitting/receiving device 10 transmits light over a wide area toward a range including a communication object according to control by the control device 50 (step S11). Note that, in step S11, the light transmitting/receiving device 10 transmits, over a wide area, signal light in which information such as position information and speed information of a transmission-side mobile body, and a position of the light receiver are included in transmitted light.

Next, the light transmitting/receiving device 10 receives signal light from the communication object (step S12). Note that, in step S12, the light transmitting/receiving device 10 receives the signal light transmitted from the communication object side, on the basis of the position information and speed information of the transmission-side mobile body, the position of the light receiver, and the like included in the transmitted light.

Next, the control device 50 calculates a relative positional relationship with the communication object on the basis of the signal light received from the communication object, and controls the light transmitting/receiving device 10 in such a way that the signal light is transmitted toward the communication object (step S13).

Then, the light transmitting/receiving device 10 selectively transmits signal light toward the communication object according to control by the control device 50 (step S14).

As described above, according to the inter-mobile-body communication system in the present example embodiment, alignment of transmitted/received light is facilitated by dynamically altering an emission shape, an emission range, and a light transmission direction of signal light projected to a communication object, and signal light can be transmitted in accordance with various directions and distances, and a movement speed of an object. Thus, even when a relative positional relationship with a communication object is unable to be accurately recognized, a communication with another mobile body can be continued. In other words, according to the inter-mobile-body communication system in the present example embodiment, even when a relative positional relationship with a communication object is unable to be accurately recognized, reliable communication with the communication object is achieved.

Modification Example

Herein, a modification example regarding emission of signal light by the inter-mobile-body communication system according to the present example embodiment is described.

Figure 10:
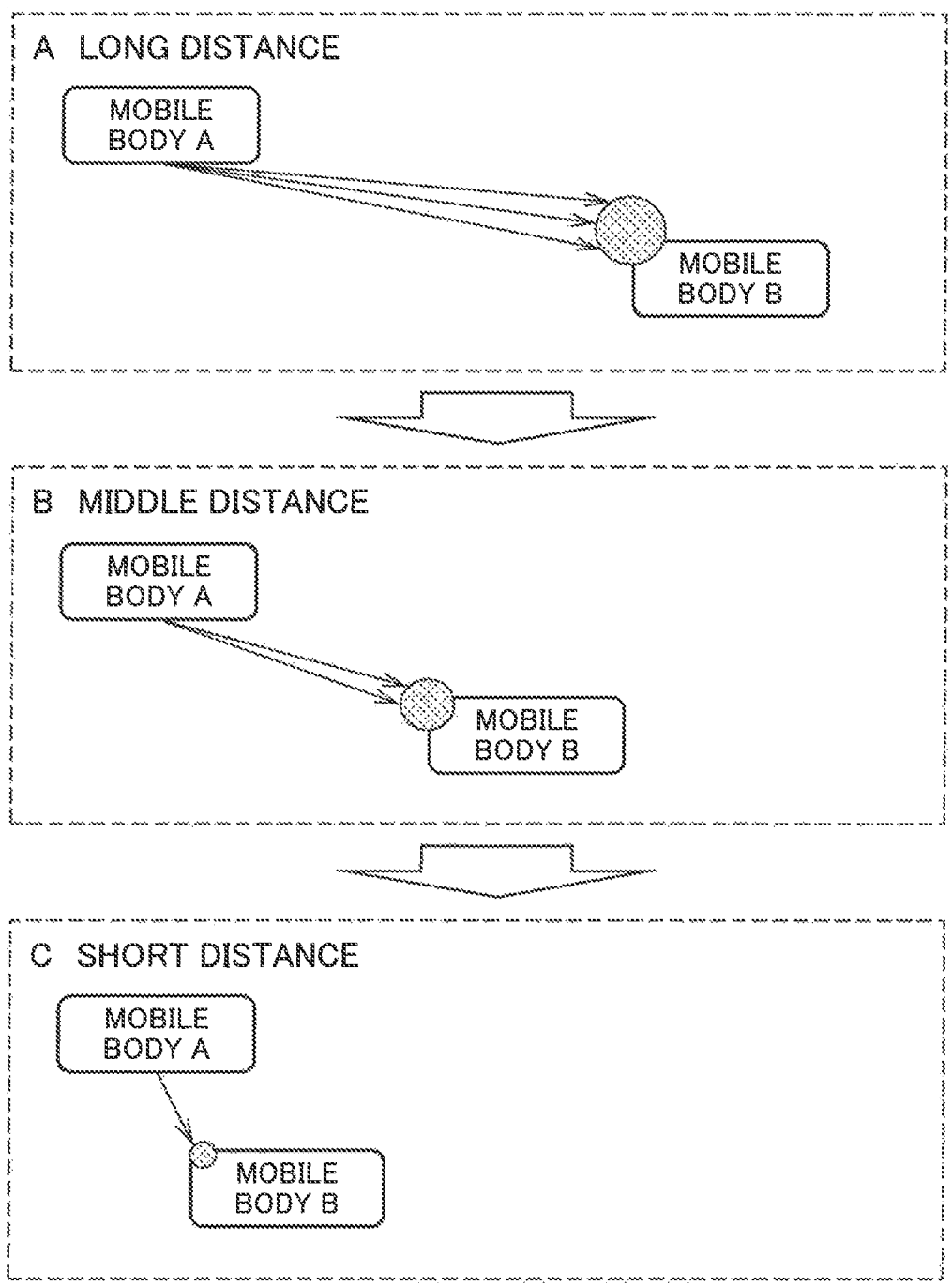
FIG. 10 is a conceptual diagram of an example in which signal light is emitted to a communication object from a mobile body equipped with the inter-mobile-body communication system according to the first example embodiment of the present invention.

FIG. 10 is an example in which an emission range of signal light is altered depending on a distance between the mobile body A and the mobile body B.

When a distance between the mobile body A and the mobile body B is a long distance (a scene A in an upper stage of FIG. 10), signal light transmitted from the mobile body A easily comes out of the light receiver of the mobile body B even by a slight change in a relative position of the mobile body B to the mobile body A. When a distance between the mobile body A and the mobile body B is a middle distance (a scene B in a middle stage of FIG. 10), signal light transmitted from the mobile body A less easily comes out of the light receiver of the mobile body B as compared to the case of the long distance. When a distance between the mobile body A and the mobile body B is a short distance (a scene C in a lower stage of FIG. 10), signal light transmitted from the mobile body A less easily comes out of the light receiver of the mobile body B as compared to the cases of the long distance and the middle distance.

Thus, it is possible to maintain a constant degree of certainty of transmission/reception of signal light, by increasing an emission range of signal light in the case of the long distance (the scene A), and decreasing an emission range of signal light as a distance shortens to the middle distance (the scene B) and the short distance (the scene C). Note that, when a distance between mobile bodies gradually increases, an emission range of signal light needs only to be increased as a distance between mobile bodies increases.

The modification example in FIG. 10 is suitable to a situation where a position relative to a vehicle running ahead gradually changes.

FIG. 11 is an example in which an emission shape of signal light is altered depending on mutual movement directions of the mobile body A and the mobile body B.

When traveling directions of the mobile body A and the mobile body B are parallel to each other (a scene A in an upper stage of FIG. 11), an emission shape of signal light is elongated along the traveling direction of the mobile body B. In this instance, the mobile body A transmits elongated signal light along its own traveling direction.

When traveling directions of the mobile body A and the mobile body B are perpendicular to each other (a scene B in a lower stage of FIG. 11), an emission shape of signal light is elongated along the traveling direction of the mobile body B. In this instance, the mobile body A transmits elongated signal light along in a direction perpendicular to its own traveling direction.

According to the modification example in FIG. 11, an area of emission of signal light to a communication object increases, and this modification example is therefore suitable to the search mode in particular.

During running, frequency of a communication between mobile bodies traveling in the same direction becomes higher. Therefore, there are more opportunities in which signal light as in the scene A is projected. On the other hand, in a situation where a mobile body is waiting for a traffic light to change at a head of an intersection, there are increasing opportunities of communicating with a mobile body traveling on an orthogonal road. In such a case, there are more opportunities in which signal light as in the scene B is projected. When a communication object is moving in such a way as to draw an arc therearound, circular-arc-shaped signal light may be transmitted.

FIG. 12 is an example in which an emission range of signal light is changed depending on a speed difference relative to a communication object.

When a relative speed difference between the mobile body A and the mobile body B is small (a scene A in an upper stage of FIG. 12), a change in a mutual positional relationship is small. Therefore, the mobile body A needs only to transmit signal light having a small spot.

On the other hand, when a relative speed difference between the mobile body A and the mobile body B is great (a scene B in a lower stage of FIG. 12), a change in a mutual positional relationship is great, and it becomes difficult for signal light to track the mobile body B. Therefore, the mobile body A needs only to transmit large signal light.

According to the modification example in FIG. 12, an emission range or an emission shape of signal light is changed on the basis of not a simple movement speed but a relative speed relationship between mobile bodies, and it is therefore possible to more reliably transmit signal light to a communication object.

According to the inter-mobile-body communication system in the present example embodiment, a reliable communication with a communication object is achieved by changing an emission shape of transmitted signal light in accordance with a relative positional relationship between mobile bodies or a movement situation as in FIGS. 10 to 12.

Second Example Embodiment

Next, an inter-mobile-body communication system according to a second example embodiment of the present invention is described. The inter-mobile-body communication system according to the present example embodiment is different from that in the first example embodiment in the configuration of a light transmitting/receiving device. Descriptions of a configuration and a function similar to those in the first example embodiment are omitted below. Note that a specific configuration of an optical system is also described in the present example embodiment.

Figure 13:
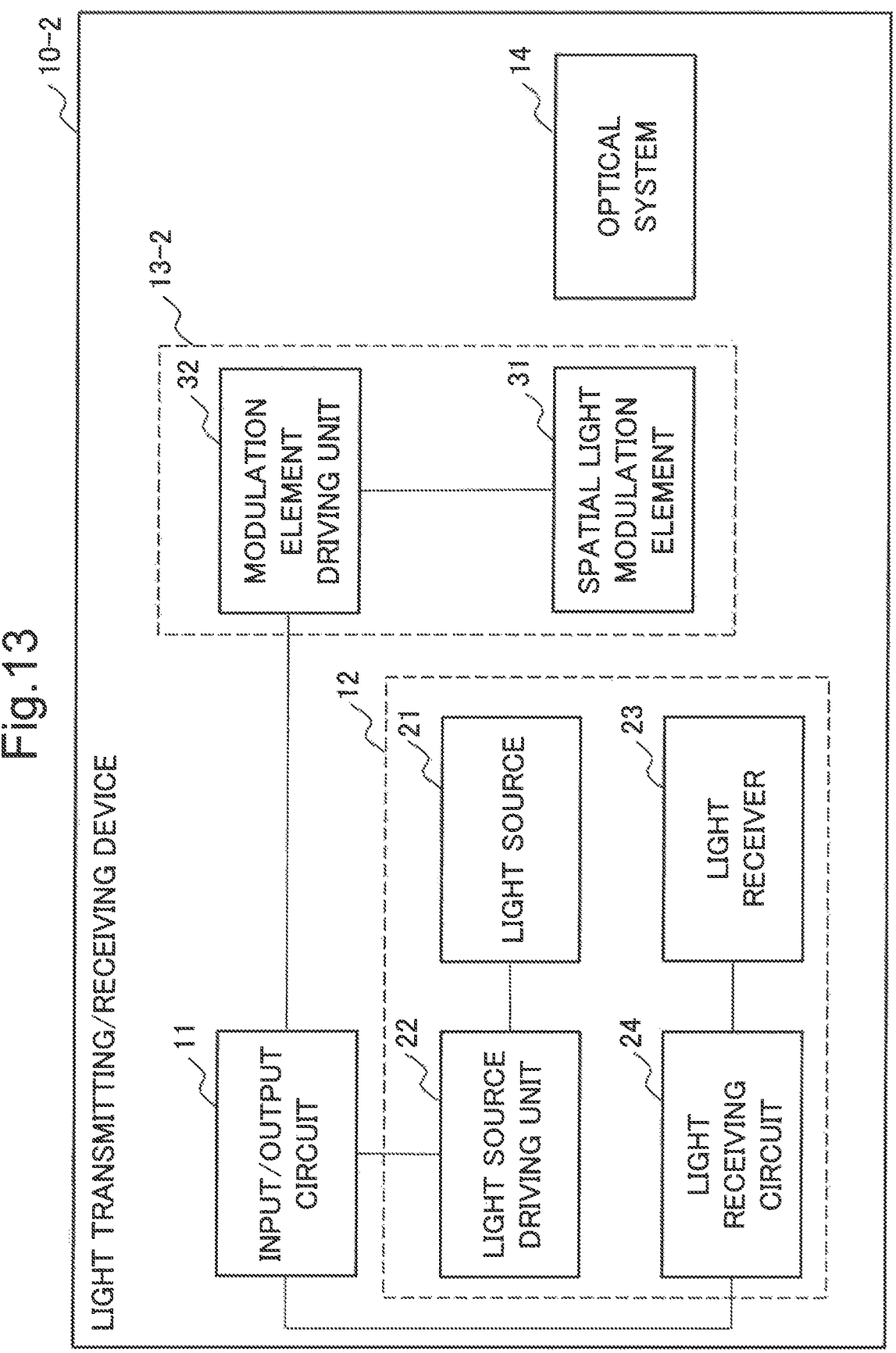
FIG. 13 is a block diagram illustrating a configuration of a light transmitting/receiving device of an inter-mobile-body communication system according to a second example embodiment of the present invention.

FIG. 13 is a block diagram illustrating a configuration of a light transmitting/receiving device 10-2 according to the present example embodiment. The light transmitting/receiving device 10-2 includes a light transmission/reception setting unit 13-2 in which the configuration of the light transmission/reception setting unit 13 according to the first example embodiment is embodied. A configuration and a function of the light transmission/reception setting unit 13-2 are described below in detail.

The light transmission/reception setting unit 13-2 includes a spatial light modulation element 31 and a modulation element driving unit 32.

The spatial light modulation element 31 displays, on a display unit thereof, a pattern corresponding to transmitted signal light, according to control by a control device 50. In the present example embodiment, in a state where a predetermined pattern is displayed on the display unit of the spatial light modulation element 31, parallel light is emitted to the display unit from a light source 21. The spatial light modulation element 31 reflects modulated light of the emitted parallel light toward an optical system 14.

The spatial light modulation element 31 includes a matrix circuit. The matrix circuit has pixels formed by electrodes such as aluminum on an uppermost layer of an address circuit formed on a substrate such as a silicon substrate, and is able to independently control potential of each pixel. The spatial light modulation element 31 has a structure in which a liquid crystal material is interposed between a transparent substrate such as glass having a transparent electrode provided therein, and the matrix circuit. When voltage of each pixel of the matrix circuit is independently controlled, a difference of refractive indices is produced by a change of a state of a liquid crystal molecule on each pixel, and a phase of entrance light is able to be changed.

The spatial light modulation element 31 may be achieved by a phase modulation type spatial light modulation element which receives entrance of coherent parallel light having uniform phase, and modulates the phase of the entrance parallel light. Thus, the light source 21 is preferably a light source which emanates laser light. The phase modulation type spatial light modulation element 31 is focus-free, and therefore does not need to change focus from distance to distance even when light is projected at a plurality of projection distances. Note that the spatial light modulation element 31 may be an element of a scheme different from the phase modulation type, but is described below as being a phase modulation type element.

The spatial light modulation element 31 is achieved by an element using, for example, ferroelectric liquid crystal, homogeneous liquid crystal, vertically aligned liquid crystal, or the like. Specifically, the spatial light modulation element 31 can be achieved by liquid crystal on silicon (LCOS). Alternatively, the spatial light modulation element 31 may be achieved by, for example, micro electro mechanical system (MEMS).

When the phase modulation type spatial light modulation element 31 is used, energy can be concentrated in a part of display information by operating in such a way as to sequentially switch regions to which signal light is transmitted. Thus, according to the phase modulation type spatial light modulation element 31, display information can be more brightly displayed than by an element of a scheme that projects light to the whole display region as long as the output of the light source 21 is the same.

Figure 14:
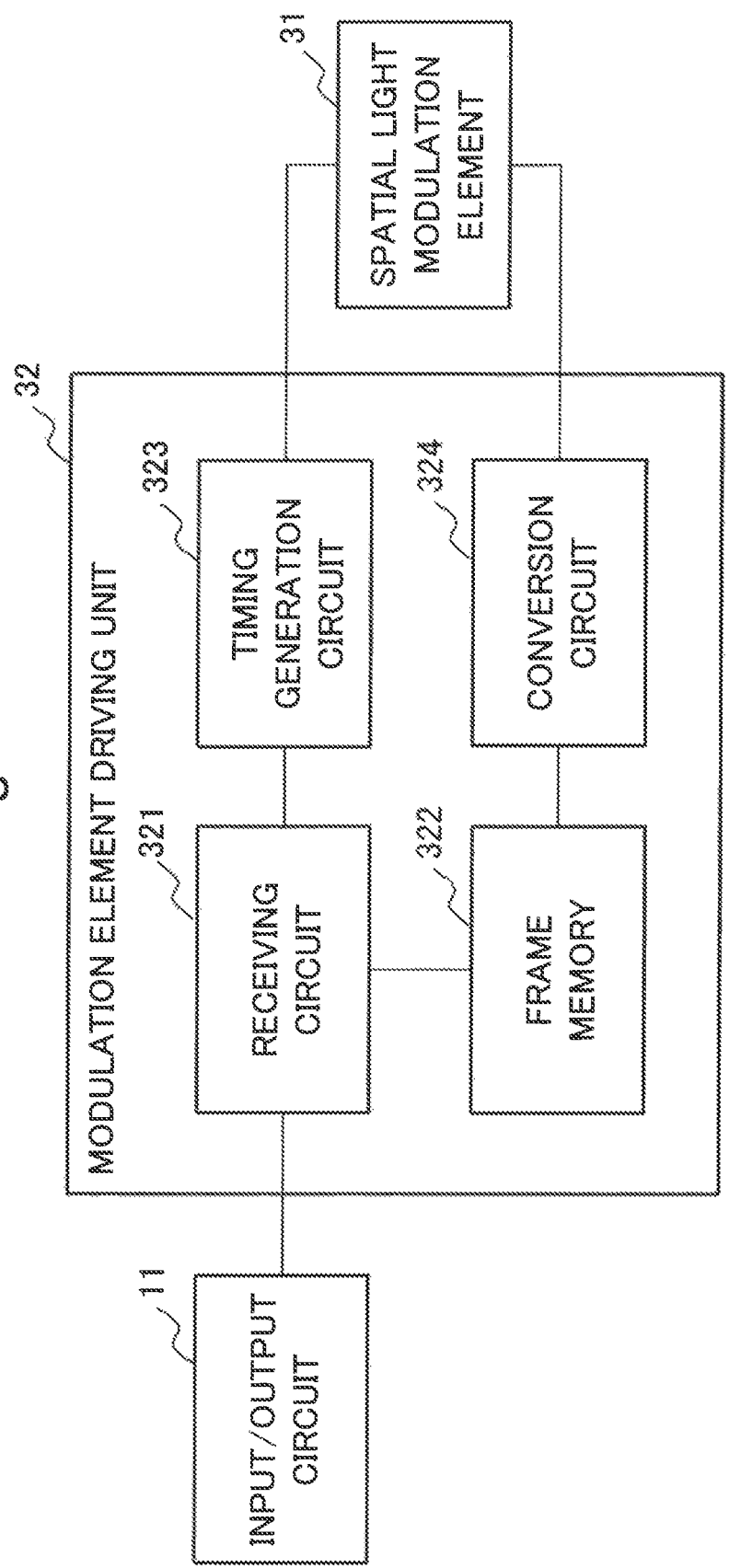
FIG. 14 is a block diagram illustrating a configuration of a modulation element driving unit included in the light transmitting/receiving device of the inter-mobile-body communication system according to the second example embodiment of the present invention.

The modulation element driving unit 32 is described in detail by use of FIG. 14. As in FIG. 14, the modulation element driving unit 32 includes a receiving circuit 321, a frame memory 322, a timing generation circuit 323, and a conversion circuit 324.

The receiving circuit 321 acquires a phase distribution displayed on the display unit of the spatial light modulation element 31 from an input/output circuit 11. For example, the receiving circuit 321 receives a phase distribution as a digital visual interface (DVI) signal. The receiving circuit 321 stores the acquired phase image in the frame memory 322. Note that the phase distribution displayed on the display unit of the spatial light modulation element 31 needs only to be stored in a storage circuit 54 of the control device 50.

The frame memory 322 stores the phase distribution displayed on the display unit of the spatial light modulation element 31. The frame memory 322 outputs the phase distribution in accordance with timing of conversion processing of the conversion circuit 324.

The timing generation circuit 323 generates timing of acquiring a phase distribution, or converting a phase distribution stored in the frame memory 322 from a digital signal to an analog signal.

The conversion circuit 324 reads the phase distribution from the frame memory 322 on the basis of the timing generated by the timing generation circuit 323, converts the read phase distribution into an analog signal, and outputs the analog signal to the spatial light modulation element 31.

The control device 50 adjusts timing of displaying a phase distribution on the display unit of the spatial light modulation element 31 to timing of emanating light by driving the light source 21. Thereby, signal light having any emission shape or emission range can be transmitted to any communication object.

Figure 15:
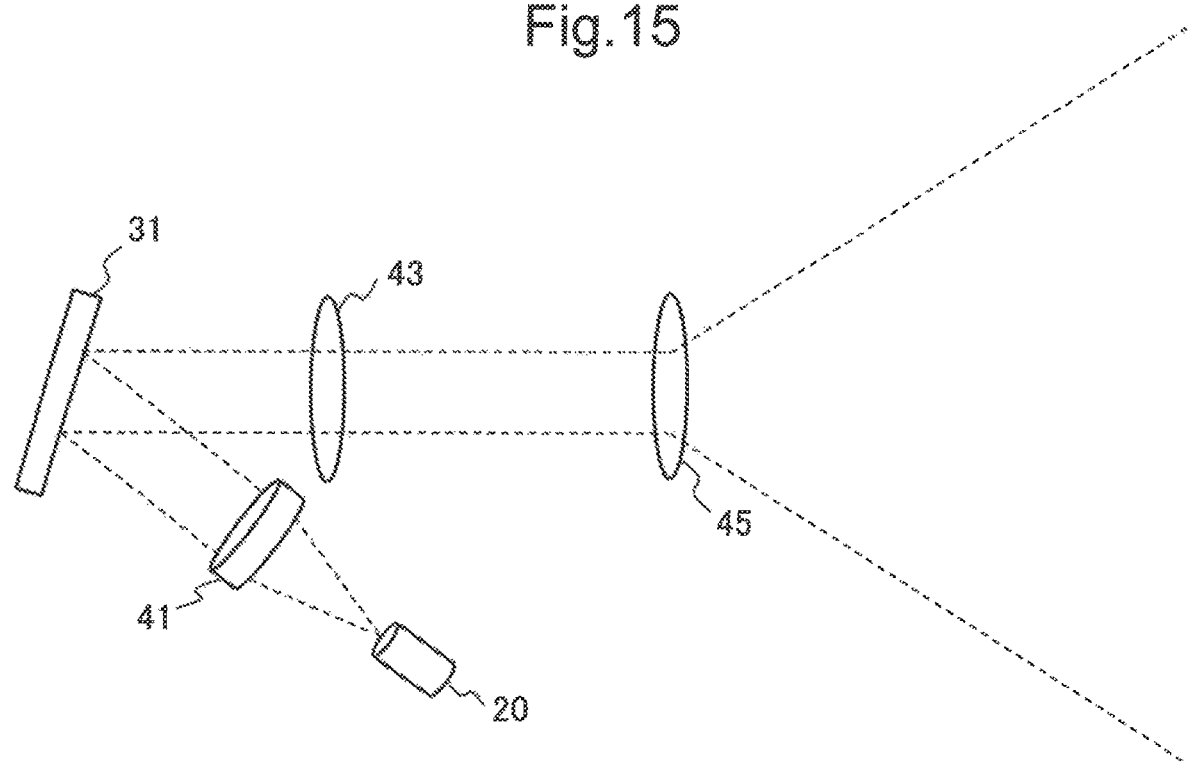
FIG. 15 is a block diagram illustrating a configuration of an optical system included in the light transmitting/receiving device of the inter-mobile-body communication system according to the second example embodiment of the present invention.

FIG. 15 is a conceptual diagram illustrating a configuration of the optical system 14 included in the light transmitting/receiving device 10-2 of the inter-mobile-body communication system according to the present example embodiment. The optical system 14 is a configuration for projecting modulated light of the spatial light modulation element 31 as signal light. The optical system 14 is also a configuration for the spatial light modulation element 31 to receive communication light from any target.

As illustrated in FIG. 15, the optical system 14 includes a collimator 41, a Fourier transform lens 43, and a projection lens 45. The modulated light of the spatial light modulation element 31 is transmitted by the optical system 14 as a signal light. Note that any one of the components of the optical system 14 may be omitted as long as signal light can be projected, or a necessary configuration may be added when some configuration is necessary.

The collimator 41 forms light emanated from the light source 21 of a light transmitting/receiving device 20 into parallel light.

The Fourier transform lens 43 is an optical lens serving to focus a figure formed when the modulated light reflected on the display unit of the spatial light modulation element 31 is projected at infinity, on the position or vicinity of the projection lens 45 or the spatial light modulation element 31.

The projection lens 45 is an optical lens which projects, in a magnified form, light converged by the Fourier transform lens 43. The projection lens 45 transmits light in such a way that signal light corresponding to the phase distribution displayed on the spatial light modulation element 31 is formed at a position of a light transmission destination. Note that the projection lens 45 may be omitted if desired communication light can be transmitted to a communication object without the projection lens 45.

Furthermore, an aperture may be disposed between the Fourier transform lens 43 and the projection lens 45. When an aperture is disposed, the aperture needs only to be disposed at a focus position of the Fourier transform lens 43. The aperture has a function of blocking high-order light included in the light converged by the Fourier transform lens 43, and identifying a display region. For example, an aperture smaller than an outermost periphery of a display region may be opened, and placed in such a way as to block a peripheral region of display information at the position of the aperture. For example, an opening part of the aperture is formed into a rectangular or circular shape. The aperture is preferably placed at the focus position of the Fourier transform lens 43, but may be out of the focus position as long as the aperture can exert a function of erasing high-order light.

When used for a purpose of projecting a line drawing such as a simple mark, signal light transmitted from the optical system 14 is not uniformly transmitted to a communication object, but is intensively projected to a part such as a character, mark, or a frame constituting display information. Thus, a light source driving unit 22 which drives the light source 21 may be lower in output, and total power consumption is able to be reduced.

Figure 16:
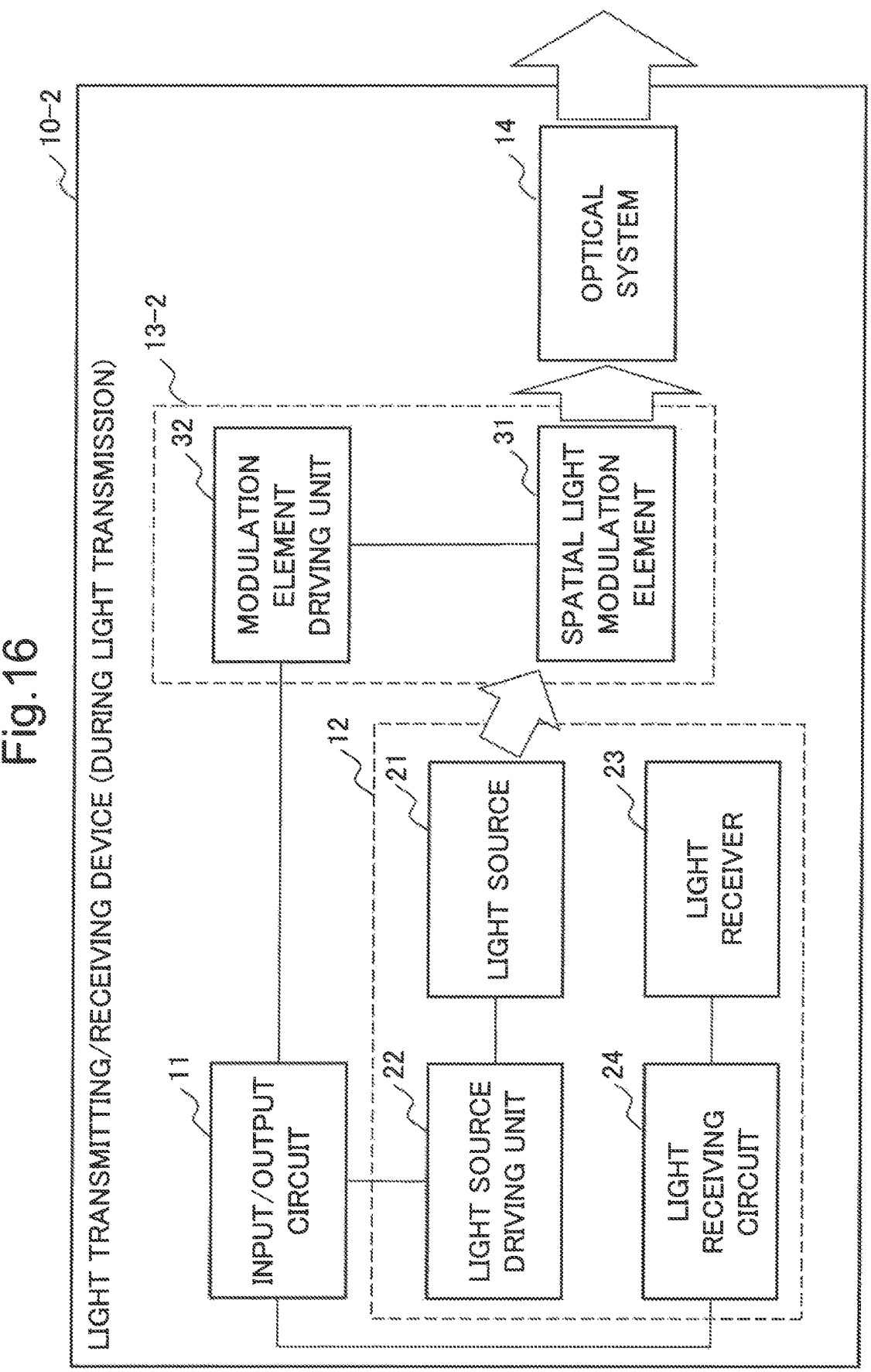
FIG. 16 is a conceptual diagram regarding transmission of signal light by the light transmitting/receiving device of the inter-mobile-body communication system according to the second example embodiment of the present invention.
Figure 17:
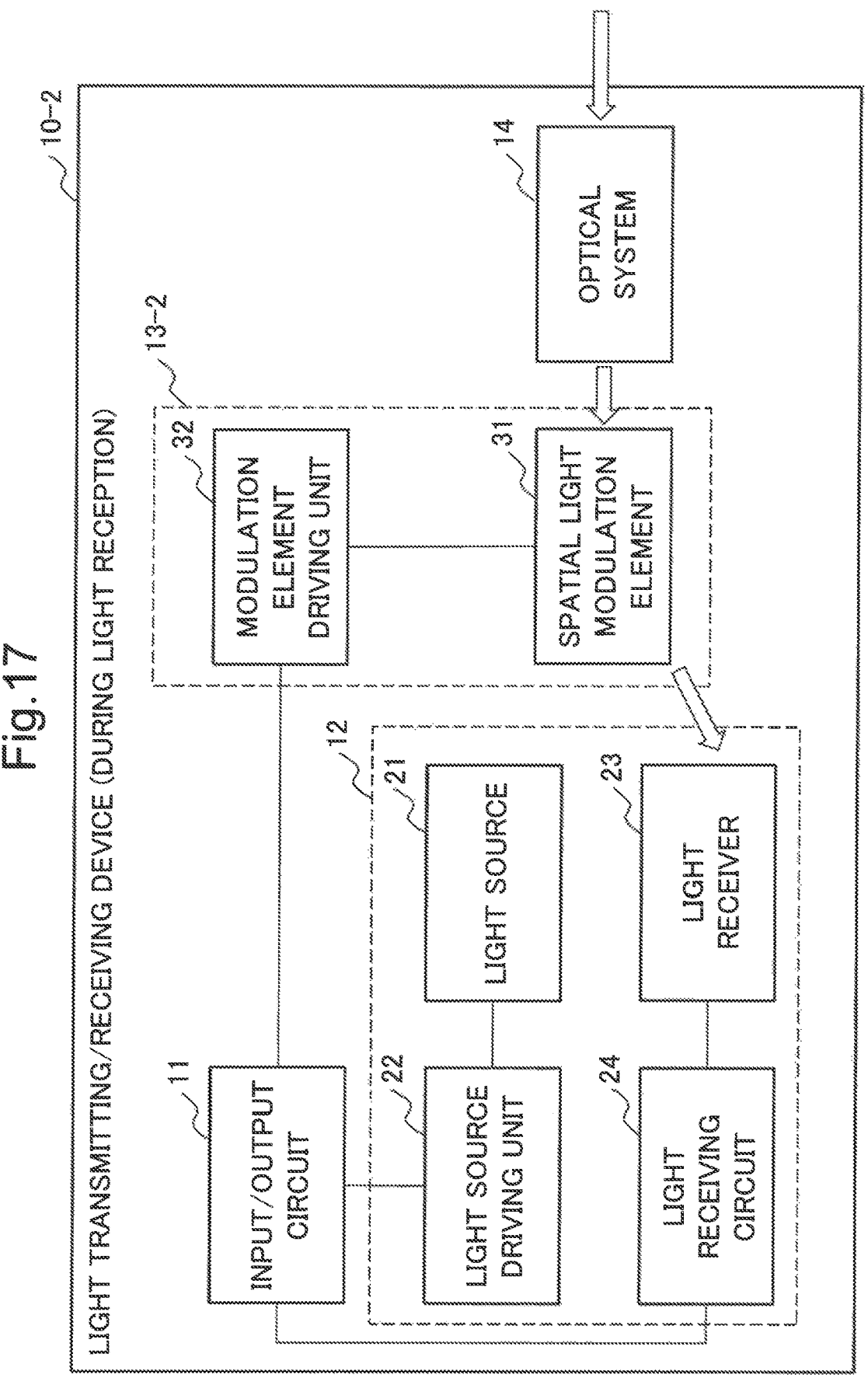
FIG. 17 is a conceptual diagram regarding reception of signal light by the light transmitting/receiving device of the inter-mobile-body communication system according to the second example embodiment of the present invention.

FIG. 16 is a conceptual diagram regarding light transmission by the light transmitting/receiving device 10-2 of the inter-mobile-body communication system according to the present example embodiment. FIG. 17 is a conceptual diagram regarding light reception by the light transmitting/receiving device 10-2 of the inter-mobile-body communication system according to the present example embodiment. Note that, in FIGS. 16 and 17, an arrow indicating a traveling direction of light is conceptualized conduction of light between components, and does not indicate an actual traveling direction.

FIG. 16 is a conceptual diagram regarding light transmission by the light transmitting/receiving device 10-2. During light transmission, the light transmitting/receiving device 10-2 converts light emanated from the light source 21 into emanation light by the spatial light modulation element 31, and transmits formed signal light via the optical system 14. In the present example embodiment, it is preferable to use a laser light source for the light source 21.

FIG. 17 is a conceptual diagram regarding light reception by the light transmitting/receiving device 10-2. During light reception, the control device 50 guides light of a communication object introduced via the optical system 14 to a light receiver 23 by controlling the spatial light modulation element 31. Moreover, the control device 50 controls in such a way as to bring signal light from a non-communication object out of the light receiver 23 by controlling the spatial light modulation element 31.

Figure 18:
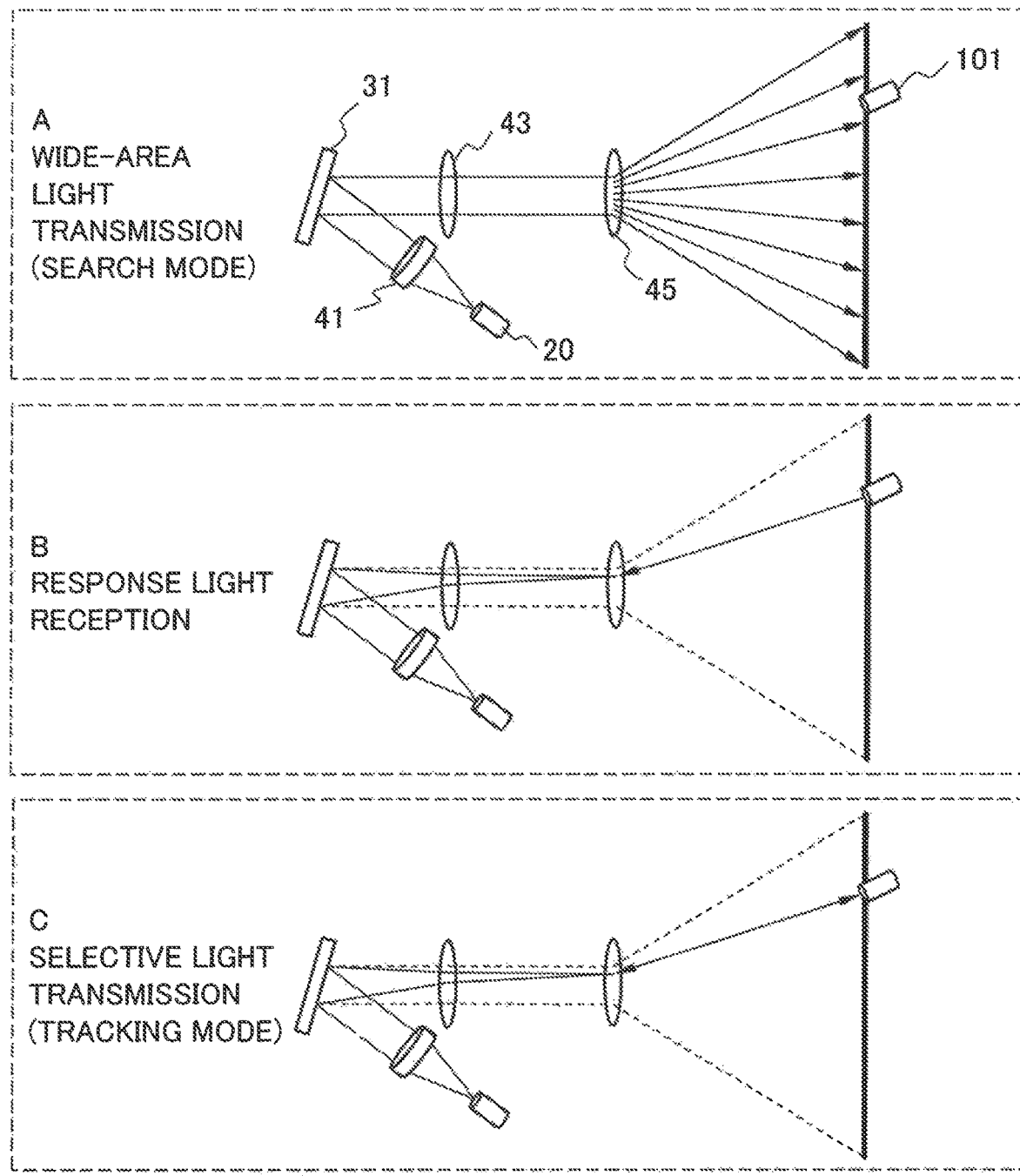
FIG. 18 is a conceptual diagram illustrating one example of transmission and reception of signal light by the inter-mobile-body communication system according to the second example embodiment of the present invention.

Herein, a characteristic regarding light transmission by the inter-mobile-body communication system according to the present example embodiment is described with reference to the drawings. FIG. 18 is a conceptual diagram illustrating one example of light transmission and light reception by the inter-mobile-body communication system according to the present example embodiment.

In FIG. 18, in a search mode (a scene A in an upper stage of FIG. 18) in which light is transmitted over a wide area, the inter-mobile-body communication system transmits signal light over a wide area toward a range including a communication object 101. In wide-area light transmission, the present system transmits, over a wide area toward the communication object 101, signal light including information such as a light transmission time, position information, speed information, operation information, and a position of the light receiver.

For this wide-area light transmission in the search mode, the communication object 101 responds to a mobile body equipped with the present system (a scene B in a middle stage of FIG. 18). In this instance, the communication object 101 transmits, toward the mobile body equipped with the present system, the signal light including information such as the light transmission time, the position information, the speed information, the operation information, and the position of the light receiver from the communication object 101. The present system acquires the information about the communication object 101 by the signal light from the communication object 101. Note that the communication object 101 may transmit signal light indicating a response to the mobile body equipped with the present system over a wide area, or may selectively transmit the same.

In a tracking mode (a scene C in a lower stage of FIG. 18) in which light is selectively transmitted, the present system selectively transmits signal light toward a light receiving unit of the communication object, and arranges an environment to communicate with the communication object.

Furthermore, according to the inter-mobile-body communication system in the present example embodiment, selective light reception for communication with a communication object alone is achieved in a situation where a plurality of objects including a non-communication object are present. FIG. 19 is a conceptual diagram illustrating selective light reception by the inter-mobile-body communication system according to the present example embodiment. In the example of FIG. 19, in wide-area light transmission, signal light is projected toward a range including the communication object 101 and a non-communication object 102.

As in FIG. 19, signal light is transmitted from the present system over a wide area to the range including the communication object 101 and the non-communication object 102 (a scene A in an upper stage of FIG. 19). In this instance, the signal light from the present system is received in the communication object 101 and the non-communication object 102.

The communication object 101 and the non-communication object 102 transmit signal light indicating responses to the present system, respectively. Note that, at a stage of wide-area light transmission, the present system receives both the signal light from the communication object 101 and the non-communication object 102, and arranges an environment in which signal light from the communication object 101 is selectively received. The signal light from the communication object 101 and the non-communication object 102 includes IDs regarding the respective objects. The present system identifies the communication object 101 by the ID included in the signal light, and controls the spatial light modulation element 31 in such a way as to receive the signal light from the communication object 101 (a scene B in a lower left stage of FIG. 19). Moreover, the present system identifies the communication object 101 by the ID included in the signal light, and controls the spatial light modulation element 31 in such a way that the signal light from the non-communication object 102 is not received (a scene C in a lower right stage of FIG. 19).

For example, the present system is able to identify a position where signal light from the non-communication object 102 enters the display unit of the spatial light modulation element at a stage of wide-area light transmission. Thus, the present system is able to control in such a way that signal light from the non-communication object 102 is not received, by displaying a display pattern that guides the signal light out of the light receiver, at a position where the signal light from the non-communication object 102 enters the display unit of the spatial light modulation element. As a result, an environment in which signal light from the communication object 101 is selectively received is arranged in the present system. Note that a method of arranging an environment in which the present system selectively receives signal light from the communication object 101 is not limited to the method cited herein.

As described above, according to the inter-mobile-body communication system in the present example embodiment, it is possible to transmit signal light having any emission shape or emission range in any direction without providing a mechanical operation unit, by setting light transmission and reception using a spatial light modulation element. Further, according to the inter-mobile-body communication system in the present example embodiment, selective light reception in which only signal light from a communication object is received is achieved. Therefore, interference between transmitted/received light from a plurality of objects is prevented, and it is possible to reliably communicate with an intended communication object.

Third Example Embodiment

Next, an inter-mobile-body communication system according to a third example embodiment of the present invention is described. The inter-mobile-body communication system according to the present example embodiment has a configuration in which an object tracking circuit is added to the control devices of the inter-mobile-body communication systems according to the first and second example embodiments. Descriptions of a configuration and a function similar to those in the first and second example embodiments are omitted below.

Figure 20:
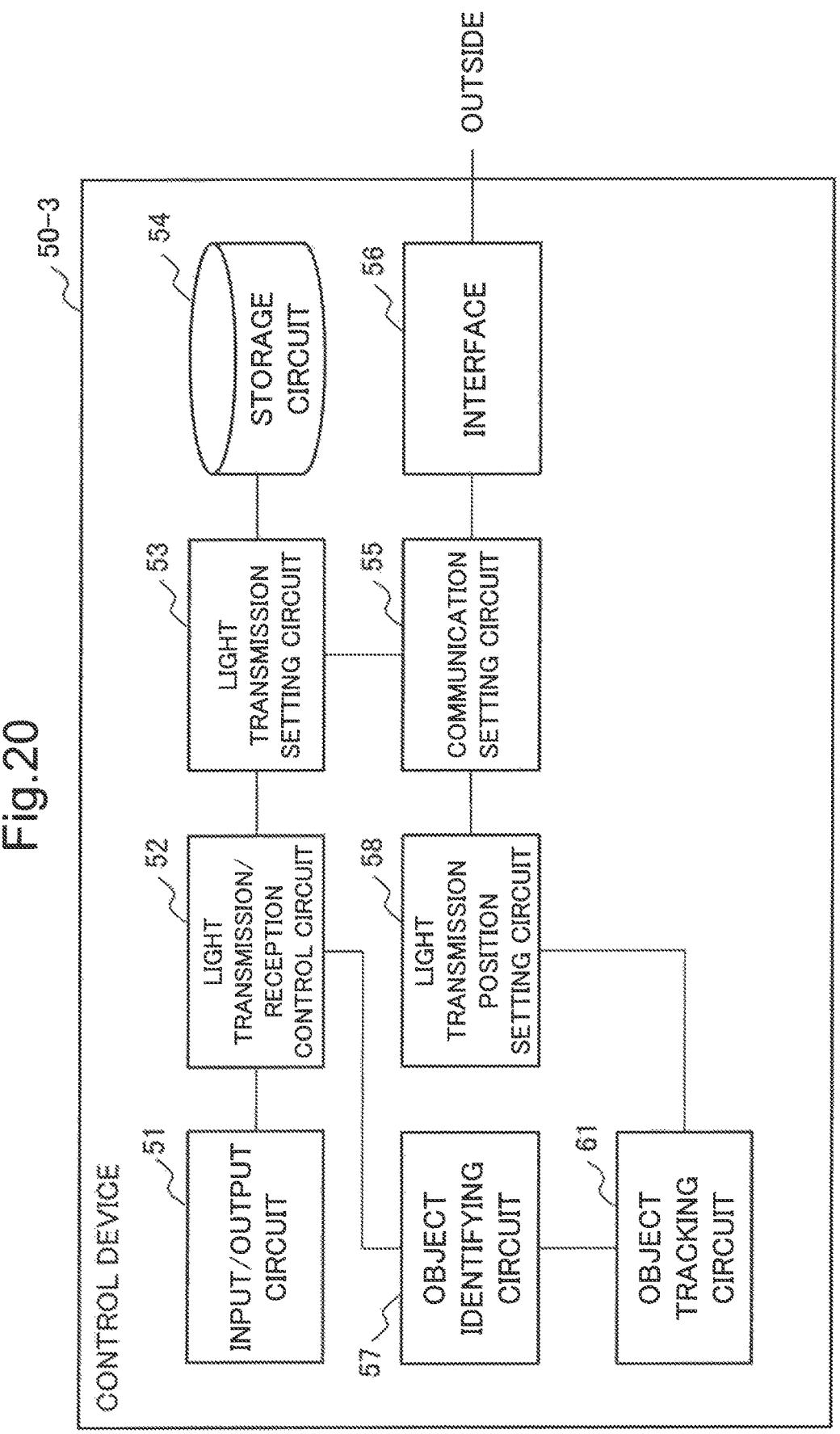
FIG. 20 is a block diagram illustrating a configuration of a control device of an inter-mobile-body communication system according to a third example embodiment of the present invention.

As in FIG. 20, the inter-mobile-body communication system according to the present example embodiment is provided with a control device 50-3 including an object tracking circuit 61.

In a tracking mode, the object tracking circuit 61 tracks a communication object by changing an emission shape of transmitted signal light depending on a situation, and adapts to various movement directions and speeds of a communication object by dynamically changing an emission shape of signal light in such a way that the communication object easily receives light. For example, when a communication with a communication object is suddenly interrupted in the tracking mode, the object tracking circuit 61 needs only to reconstruct a communication with the communication object by changing an emission shape or an emission range of signal light. When a communication with a communication object is unable to be reconstructed in the tracking mode, the object tracking circuit 61 needs only to search for a communication object by returning to the search mode.

Figure 21:
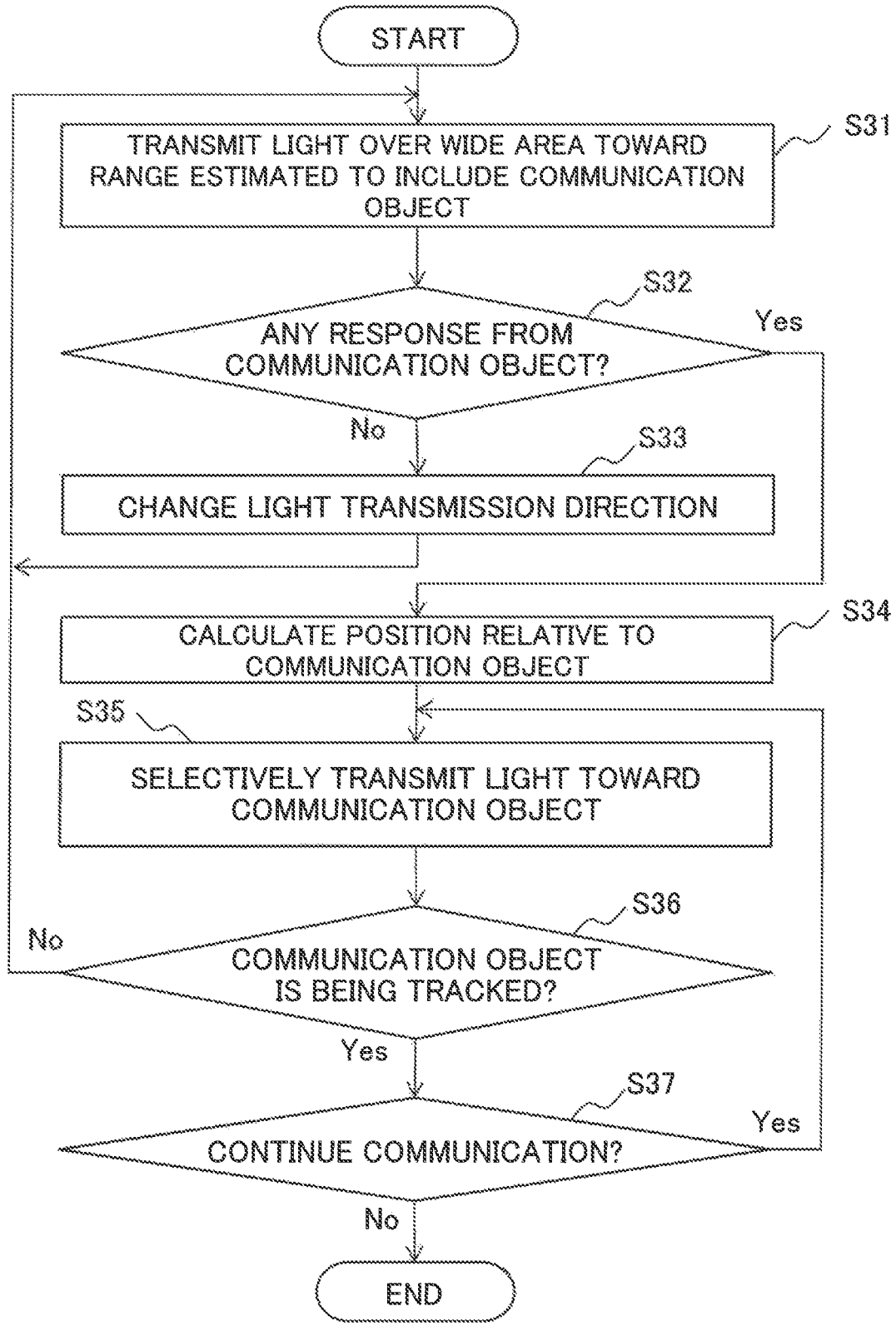
FIG. 21 is a flowchart regarding an operation of the inter-mobile-body communication system according to the third example embodiment of the present invention.

Herein, FIG. 21 illustrates a flowchart including an operation corresponding to the case where a communication with a communication object is interrupted in the tracking mode. Note that the light transmitting/receiving device 10-2 according to the second example embodiment is used in the following description.

In FIG. 21, first, the light transmitting/receiving device 10-2 transmits signal light over a wide area toward a range estimated to include a communication object (step S31).

When there is no response from the communication object (No in step S32), the light transmitting/receiving device 10-2 changes a light transmission direction of the signal light (step S33), and returns to step S31.

On the other hand, when there is a response from the communication object (Yes in step S32), the control device 50-3 calculates a relative positional relationship with the communication object (step S34).

Then, the light transmitting/receiving device 10-2 selectively transmits signal light toward the communication object (step S35).

Herein, in the case where the communication object is tracked (Yes in step S36), the light transmitting/receiving device 10-2 returns to step S35 when continuing the communication (Yes in step S37), or the light transmitting/receiving device 10-2 finishes the processing along the flowchart in FIG. 21 when finishing the communication (No in step S37).

On the other hand, in the case where the communication object can no longer be tracked (No in step S36), the light transmitting/receiving device 10-2 returns to step S31, and then executes the search mode.

As described above, according to the inter-mobile-body communication system in the present example embodiment, even when a communication with a communication object is interrupted, it is possible to return to the search mode and then construct an environment for re-communication with the communication object. Moreover, according to the present example embodiment, it is possible to more reliably maintain an environment of communication with a communication object by dynamically changing an emission shape or an emission range of signal light in such a way as to track the communication object.

Fourth Example Embodiment

Next, an inter-mobile-body communication system according to a fourth example embodiment of the present invention is described. The inter-mobile-body communication system according to the present example embodiment has a configuration in which an object selecting circuit is added to the control devices of the inter-mobile-body communication systems according to the first and second example embodiments. Note that an object selecting circuit may be added to the inter-mobile-body communication system according to the third example embodiment. Descriptions of a configuration and a function similar to those in the first and second example embodiments are omitted below.

Figure 22:
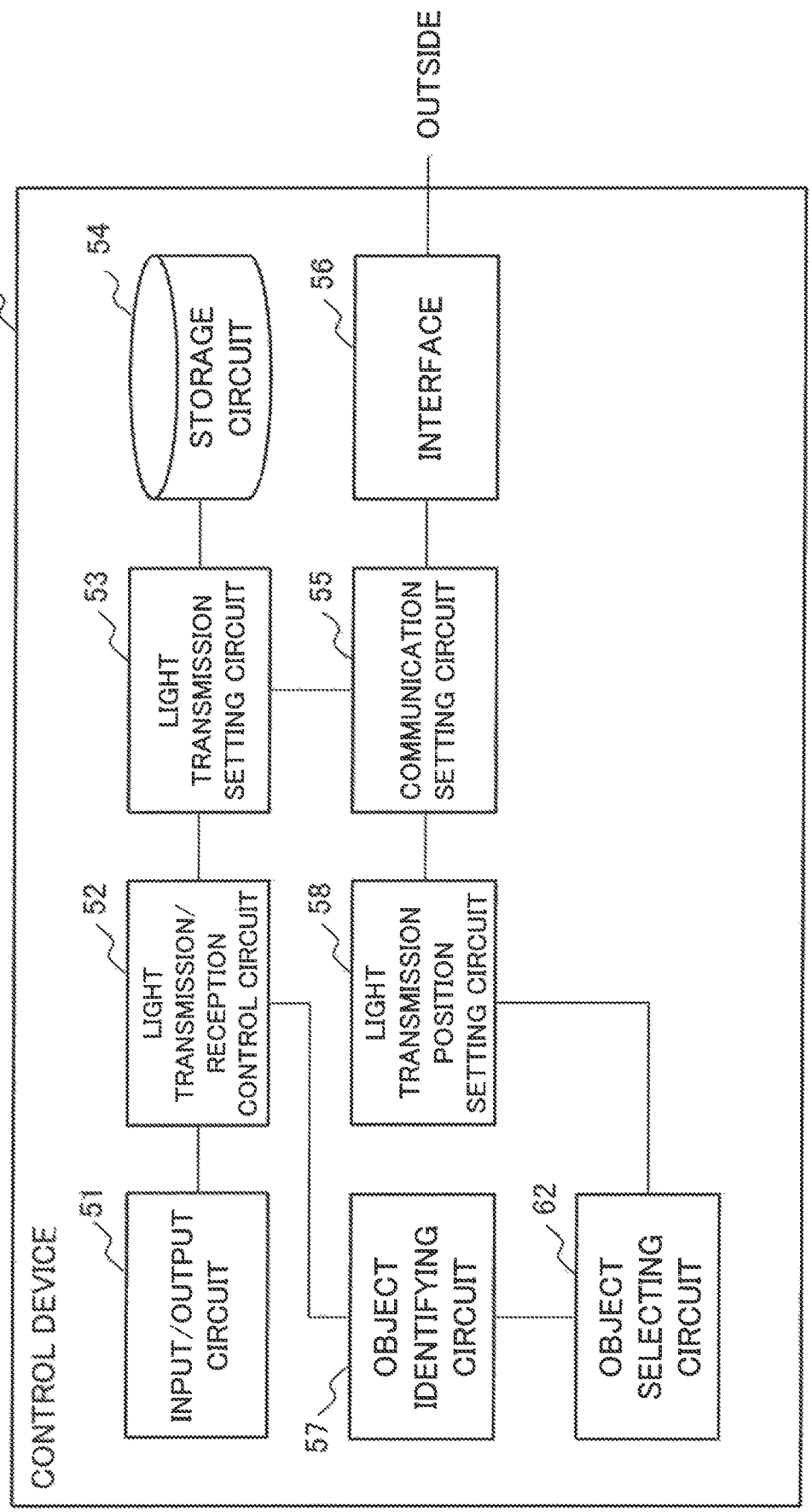
FIG. 22 is a block diagram illustrating a configuration of a control device of the inter-mobile-body communication system according to the third example embodiment of the present invention.

As in FIG. 22, the inter-mobile-body communication system according to the present example embodiment is provided with a control device 50-4 including an object selecting circuit 62. The object selecting circuit 62 is a circuit which controls in such a way as to selectively construct an environment for communication with a communication object, in an environment in which signal light from a plurality of objects is received.

[Selective Light Reception]

Figure 23:
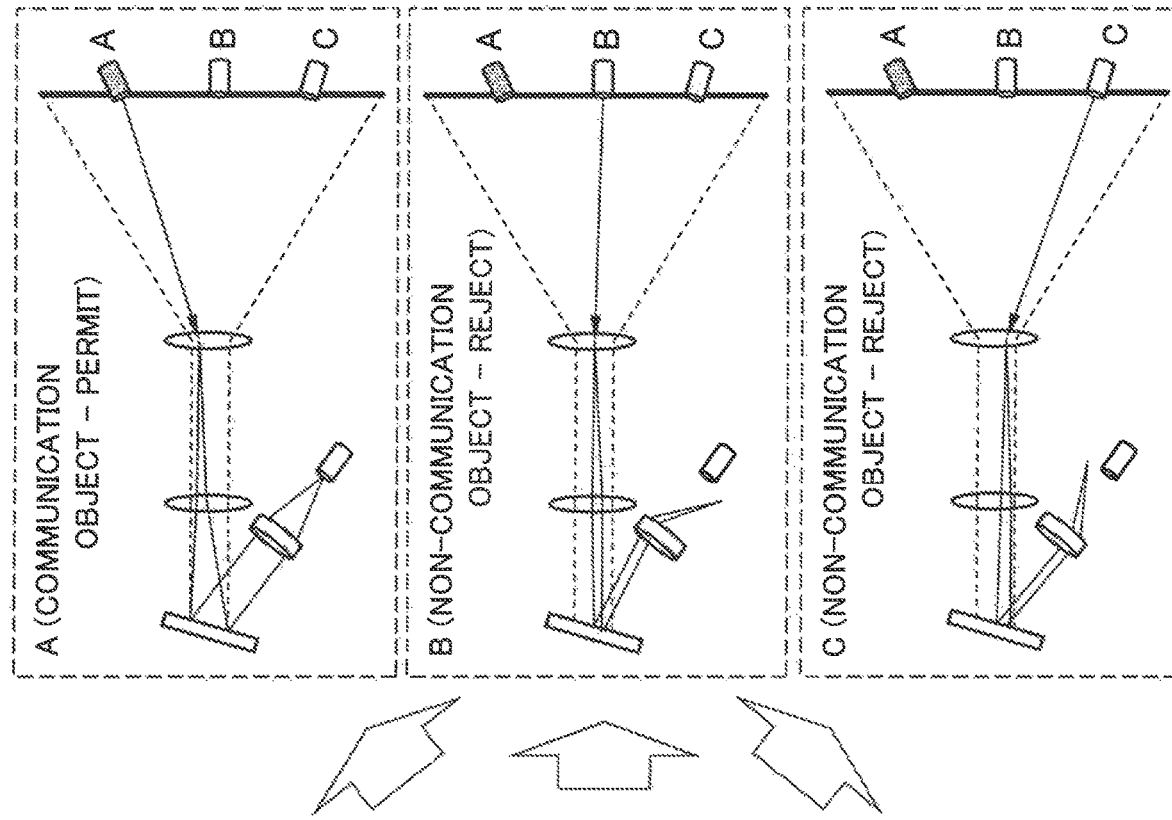
FIG. 23 is a conceptual diagram illustrating one example in which an inter-mobile-body communication system according to a fourth example embodiment of the present invention selectively receives signal light from a communication object.

FIG. 23 is a conceptual diagram illustrating one example in which the inter-mobile-body communication system according to the present example embodiment selectively receives signal light from a communication object.

In a state within a left frame of FIG. 23, the present system receives signal light from a plurality of objects (objects A, B, and C). Note that, in the example of FIG. 23, an object for which a communication environment should be constructed is the object A.

The object selecting circuit 62 analyzes IDs included in the signals received from the plurality of objects, selects a signal including the ID of the communication object, and outputs, to a light transmission position setting circuit 58, an indication signal indicating that signal light from the object A being a transmission destination of the signal is received. On the other hand, the object selecting circuit 62 selects a signal including the IDs of non-communication objects, and outputs, to the light transmission position setting circuit 58, an indication signal indicating that signal light from the objects B and C being transmission destinations of the signal are not received.

The light transmission position setting circuit 58 sets a light transmission position of signal light in response to the indication signal from the object selecting circuit 62. In other words, the signal light from the object A is guided to a light transmitting/receiving device 20 (a scene A in an upper right stage of FIG. 23). On the other hand, the signal light from the objects B and C is guided out of the light transmitting/receiving device 20 (a scene B in a middle right stage and a scene C in a lower right stage of FIG. 23). As a result, the inter-mobile-body communication system according to the present example embodiment selectively receives signal light from the object A being a communication object.

Figure 24:
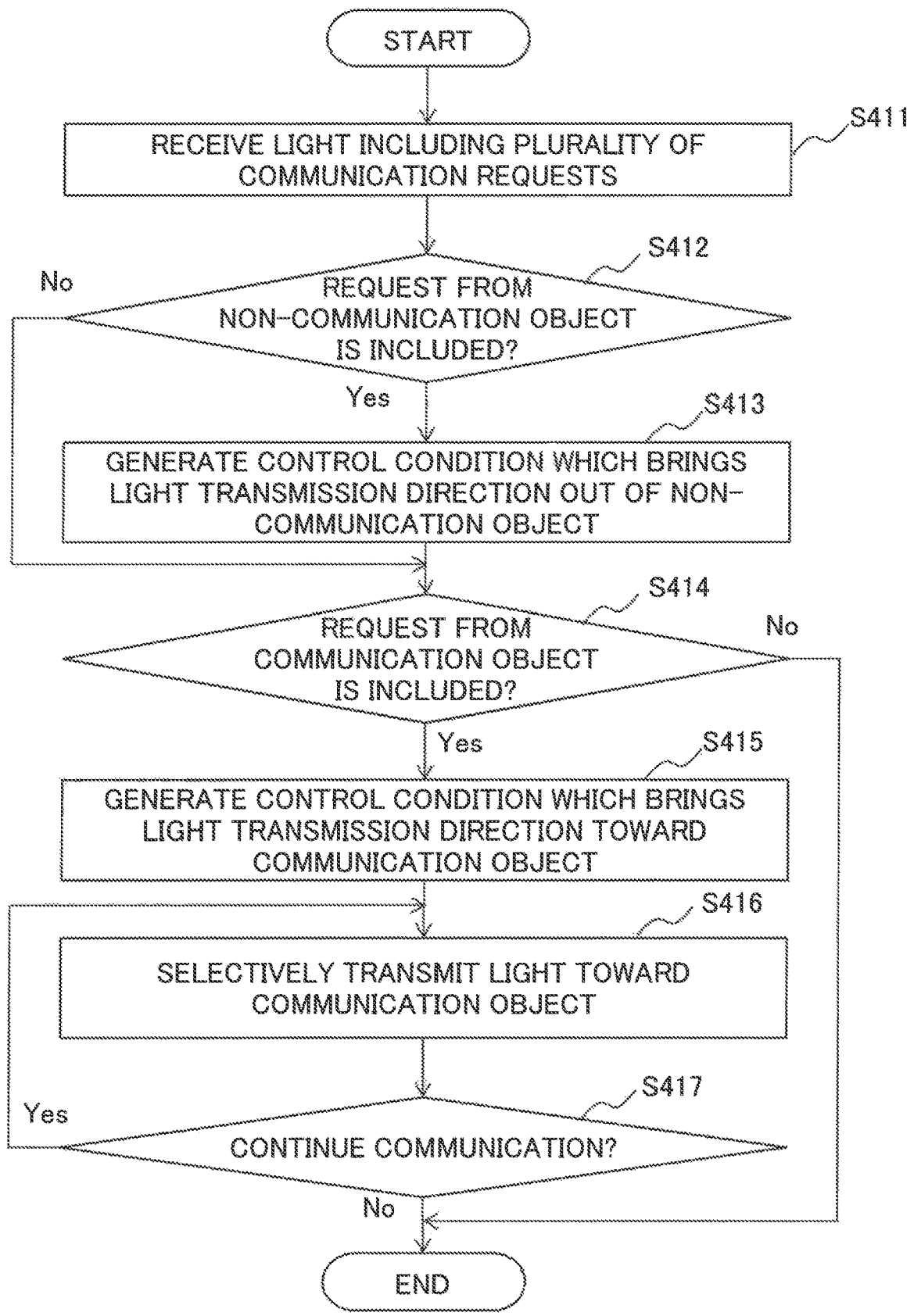
FIG. 24 is a flowchart regarding an operation in which the inter-mobile-body communication system according to the fourth example embodiment of the present invention selectively receives signal light from a communication object.

Herein, FIG. 24 illustrates a flowchart including an operation which selectively constructs an environment for communication with a communication object, in an environment in which signal light from a plurality of objects is received. Note that, in the following description, the light transmitting/receiving device 10-2 according to the second example embodiment and the control device 50-4 according to the present example embodiment are mainly described.

In FIG. 24, first, the light transmitting/receiving device 10-2 receives signal light including communication requests from a plurality of objects (step S411).

When a request from a non-communication object is included (Yes in step S412), the control device 50-4 generates a control condition which brings a light transmission direction of signal light out of the non-communication object (step S413).

On the other hand, when a request from a non-communication object is not included (No in step S412), the control device 50-4 proceeds to step S414.

When a request from a communication object is included (Yes in step S414), the control device 50-4 generates a control condition in which signal light is selectively transmitted with a light transmission direction thereof brought toward the communication object (step S415).

On the other hand, when a request from a communication object is not included (No in step S414), the control device 50-4 finishes the processing along the flowchart in FIG. 24.

On the basis of the control condition generated by the control device 50-4, the light transmitting/receiving device 10-2 selectively transmits light toward the communication object (step S416).

When the communication is continued (Yes in step S417), the processing in step S416 is continued. When the communication is finished (No in step S417), the processing along the flowchart in FIG. 24 is finished.

[Time Division]

Figure 25:
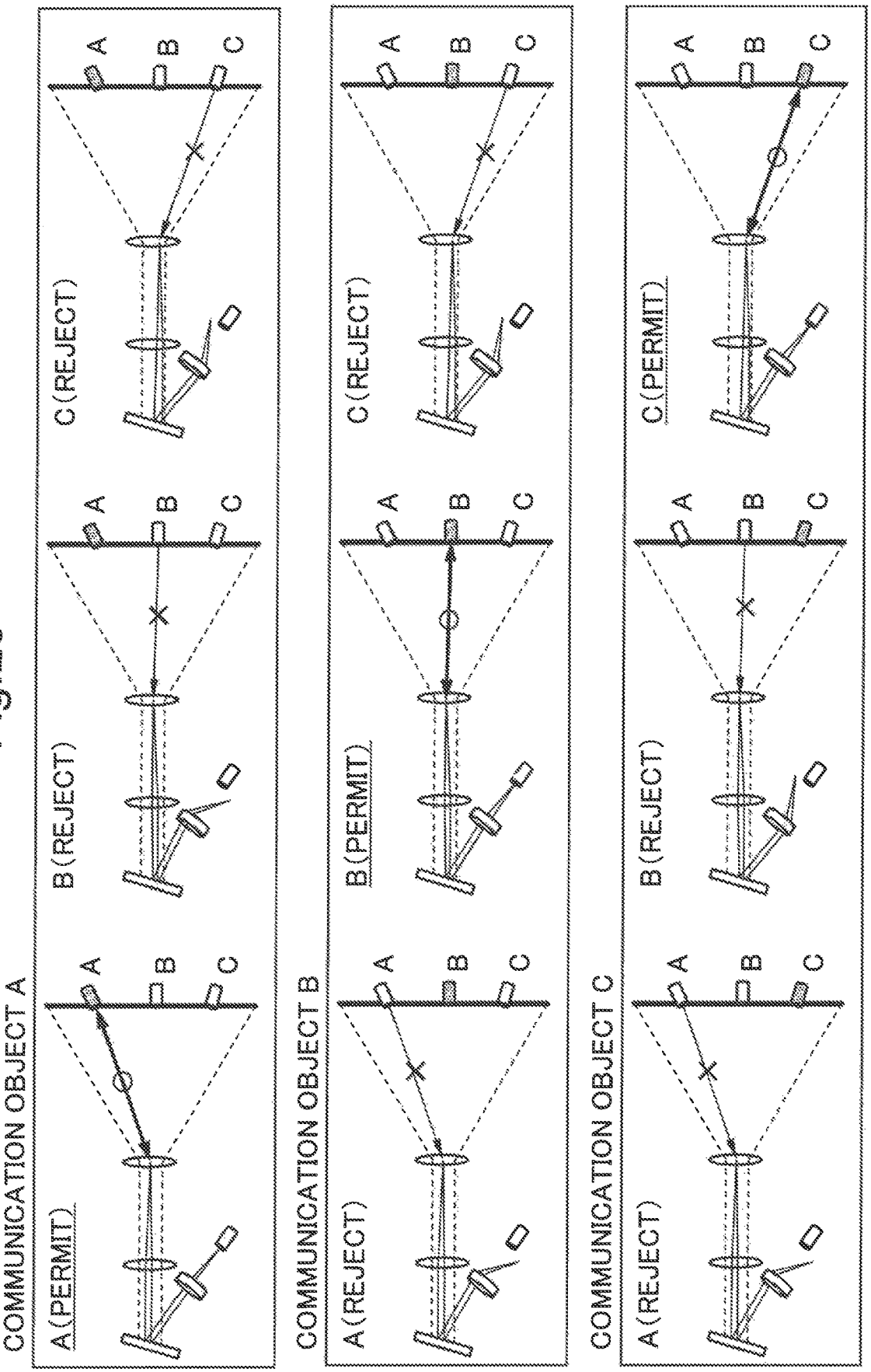
FIG. 25 is a conceptual diagram illustrating one example in which the inter-mobile-body communication system according to the fourth example embodiment of the present invention receives signal light from a plurality of communication objects without interference.

Furthermore, the inter-mobile-body communication system according to the present example embodiment is capable of time-division processing which switches a communication object among a plurality of communication objects depending on time as in FIG. 25. FIG. 25 is a conceptual diagram illustrating one example in which the inter-mobile-body communication system according to the present example embodiment receives light from a plurality of communication objects without interference.

As in an upper stage of FIG. 25, in a period in which the object A is a communication object, the control device 50-4 permits reception of signal light from the object A, and rejects reception of signal light from the objects B and C. Further, as in a middle stage of FIG. 25, in a period in which the object B is a communication object, the control device 50-4 permits reception of signal light from the object B, and rejects reception of signal light from the objects A and C. Similarly, as in a lower stage of FIG. 25, in a period in which the object C is a communication object, the control device 50-4 permits reception of signal light from the object C, and rejects reception of signal light from the objects A and B.

By the processing as in FIG. 25, the inter-mobile-body communication system according to the present example embodiment is able to construct an environment for communication with a plurality of communication objects without interference.

Figure 26:
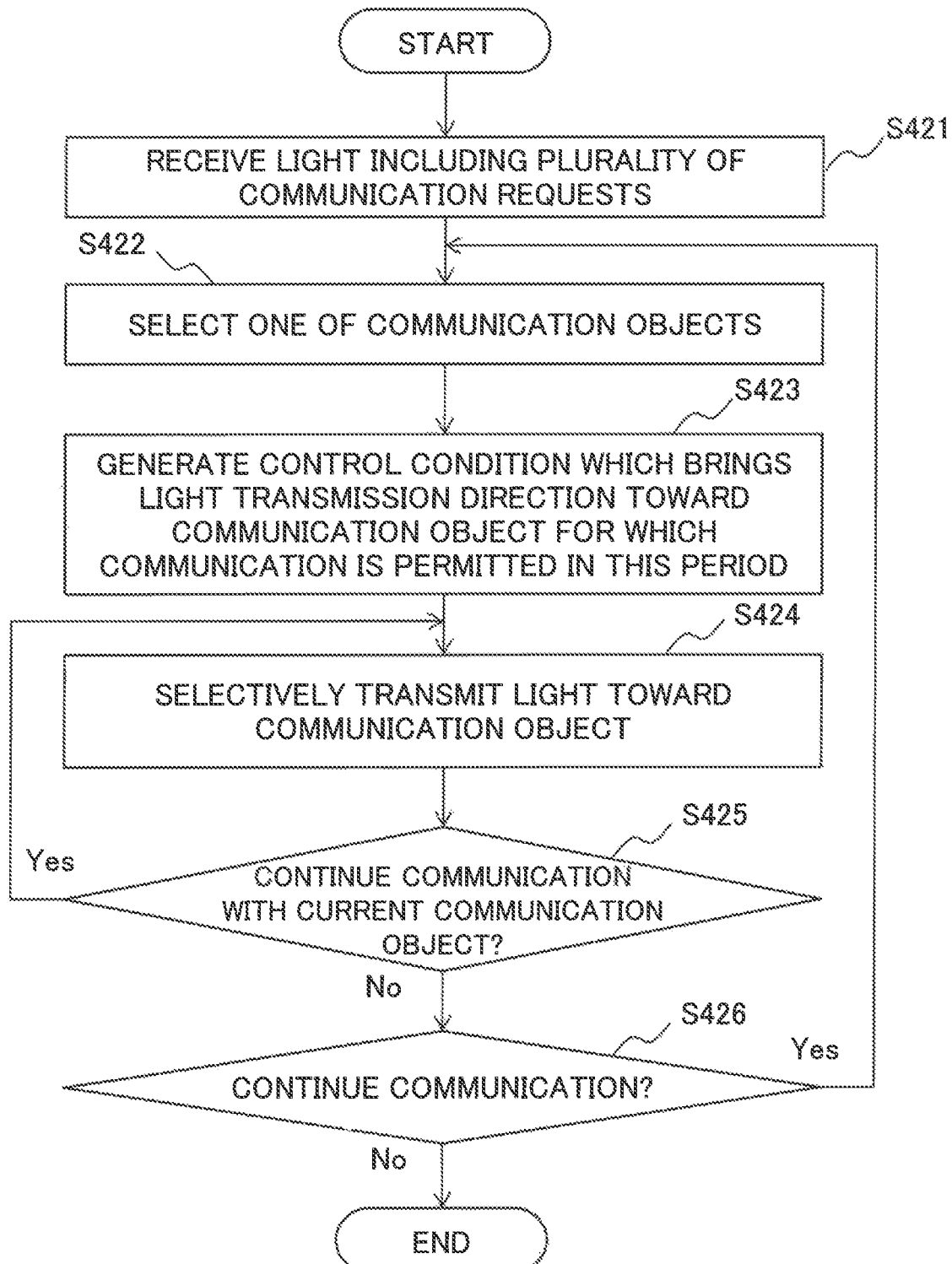
FIG. 26 is a flowchart regarding an operation in which the inter-mobile-body communication system according to the fourth example embodiment of the present invention receives signal light from a plurality of communication objects without interference.

Herein, FIG. 26 illustrates a flowchart including an operation which constructs an environment for communication with a plurality of communication objects without interference. Note that, in the following description, the light transmitting/receiving device 10-2 according to the second example embodiment and the control device 50-4 according to the present example embodiment are mainly described.

In FIG. 26, first, the light transmitting/receiving device 10-2 receives light including communication requests from a plurality of objects (step S421). It is assumed that all the objects correspond to communication objects in the example of FIG. 26.

The control device 50-4 selects one of the plurality of communication objects (step S422). A communication object may be be selected in accordance with setting such as a degree of urgency or a degree of priority of a communication with a communication object.

The control device 50-4 generates a control condition which brings a light transmission direction toward a communication object for which communication is permitted in this period (step S423).

On the basis of the control condition generated by the control device 50-4, the light transmitting/receiving device 10-2 selectively transmits signal light toward the communication object for which communication is permitted in this period (step S424).

When the communication with the current communication object is continued (Yes in step S425), the processing in step S424 is continued.

On the other hand, when the communication with the current communication object is finished (No in step S425), and when communication is continued (Yes in step S426), the light transmitting/receiving device 10-2 returns to step S422, and then re-selects a communication object. Alternatively, when communication is finished (No in step S426), the light transmitting/receiving device 10-2 finishes the processing along the flowchart in FIG. 26.

[Space Division]

Figure 27:
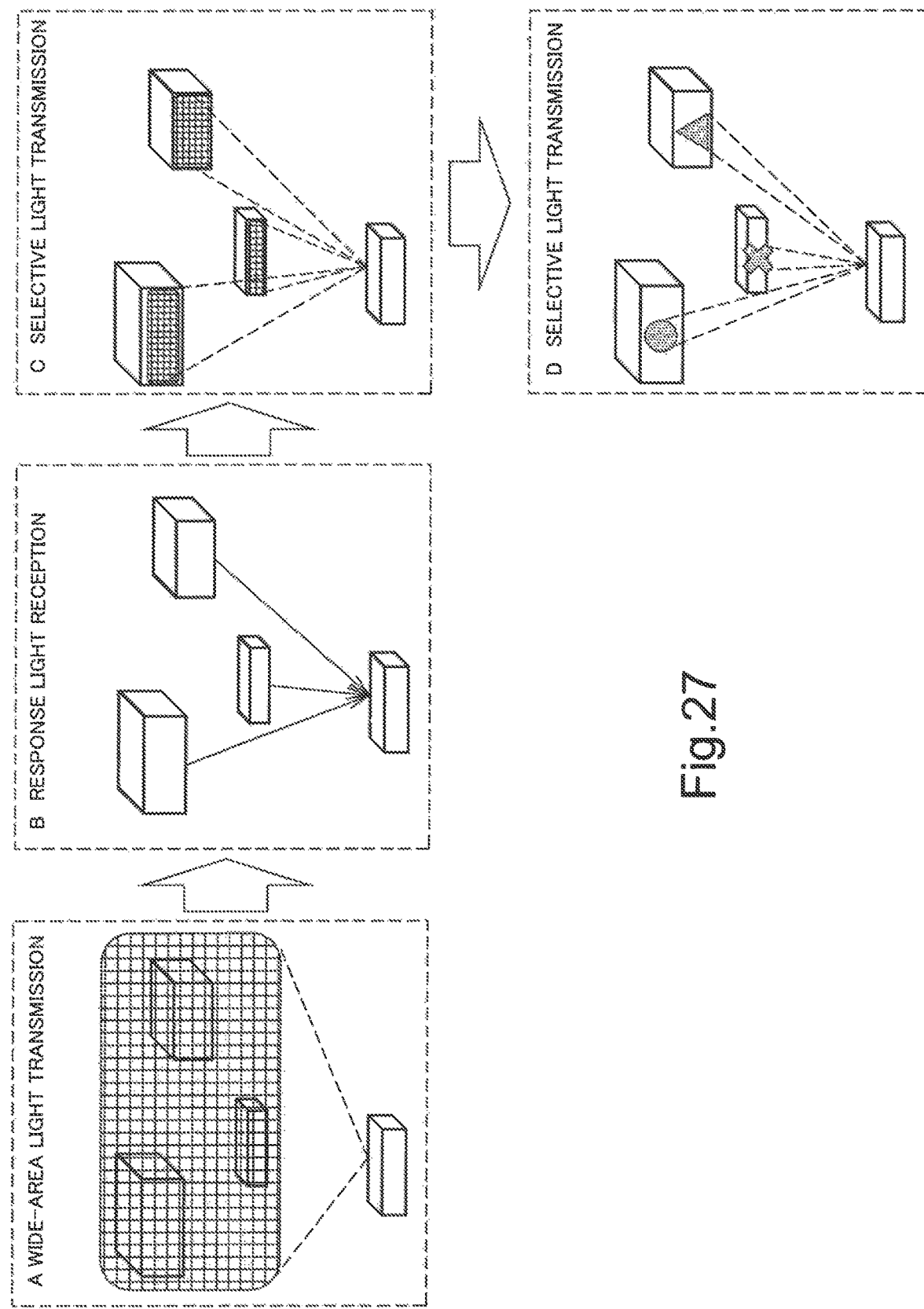
FIG. 27 is a conceptual diagram illustrating one example in which an inter-mobile-body communication system according to a fourth example embodiment of the present invention multicasts signal light to a plurality of communication objects.

When signal light is transmitted to a plurality of communication objects, a technique of space division may be selected as in FIG. 27 instead of the time division as in FIG. 25.

The example of FIG. 27 is similar to those in FIGS. 23 and 25 up to wide-area light transmission (a scene A in an upper left stage of FIG. 27) and response light reception (a scene B in an upper middle stage of FIG. 27). A difference is that signal light is received from a plurality of communication objects, information about each communication object is thereby acquired, and signal light toward the respective communication objects is selectively transmitted at one time by direction control (a scene C in an upper right stage of FIG. 27). Such control can be achieved without a mechanically operating mechanism by a light transmitting/receiving device using a phase modulation type spatial light modulation element. In selective light transmission, an emission shape of signal light may be changed depending on a situation, as in a scene D in a lower stage of FIG. 27.

As in FIG. 27, according to the present example embodiment, signal light is able to be multicast to a plurality of communication objects. For example, multicasting is effective in a scene where signal light including emergency information is unilaterally transmitted to a plurality of communication objects at one time.

Figure 28:
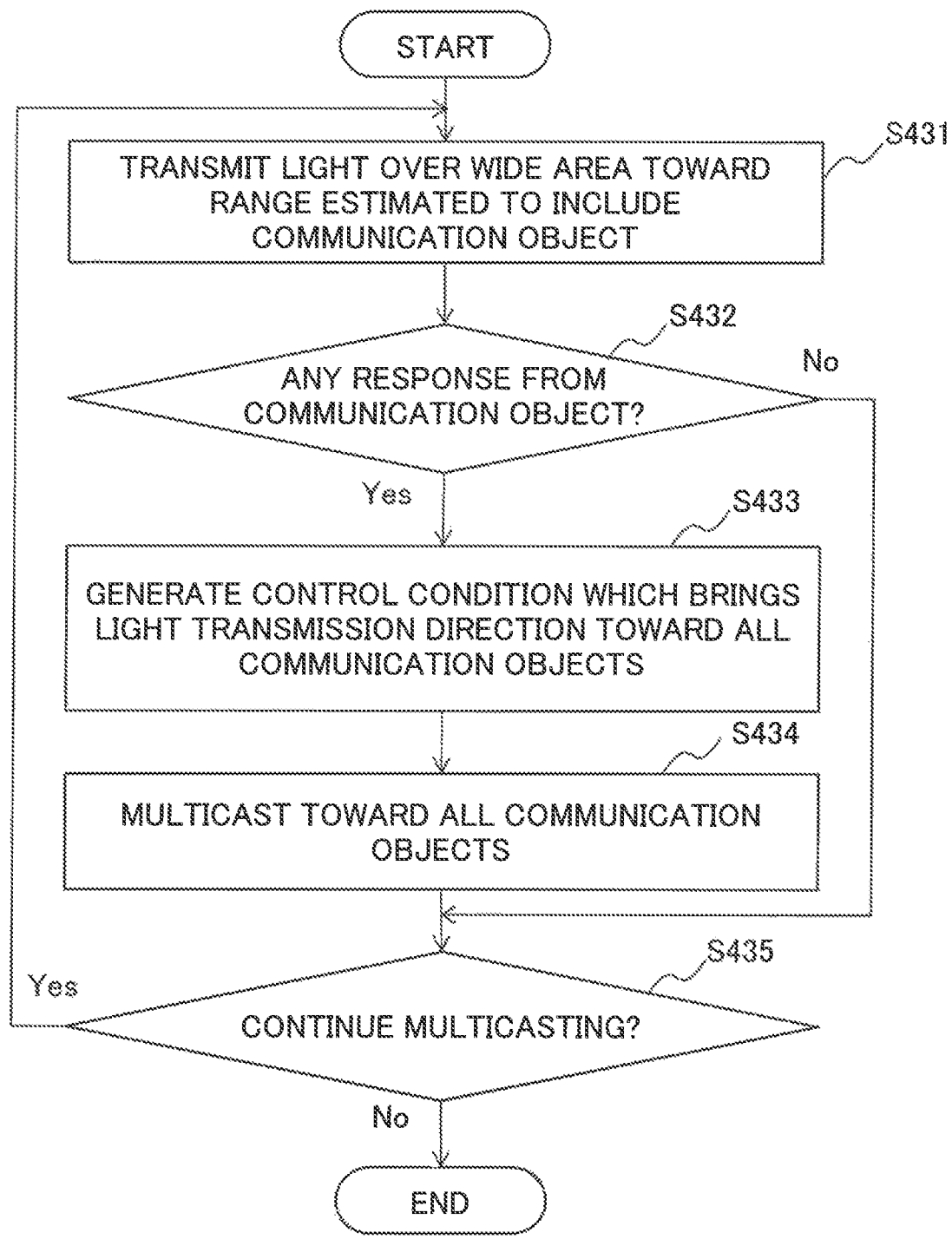
FIG. 28 is a flowchart regarding an operation in which the inter-mobile-body communication system according to the fourth example embodiment of the present invention multicasts signal light.

Herein, FIG. 28 illustrates a flowchart including an operation which achieves multicasting to a plurality of communication objects. Note that, in the following description, the light transmitting/receiving device 10-2 according to the second example embodiment and the control device 50-4 according to the present example embodiment are mainly described.

In FIG. 28, first, the light transmitting/receiving device 10-2 transmits signal light over a wide area toward a range estimated to include a communication object (step S431).

When there is no response from the communication object (No in step S432), the light transmitting/receiving device 10-2 proceeds to step S435.

On the other hand, when there is a response from the communication object (Yes in step S432), the control device 50-4 generates a control condition which brings a light transmission direction toward a plurality of communication objects in this period (step S433). Note that, when a non-communication object is present, the control device 50-4 may additionally perform control which brings a light transmission direction out of the non-communication object.

On the basis of the control condition generated by the control device 50-4, the light transmitting/receiving device 10-2 selectively transmits light toward a plurality of communication objects (step S434).

When multicasting is continued (Yes in step S435), the light transmitting/receiving device 10-2 returns to step S431. On the other hand, when multicasting is finished (No in step S435), the processing along the flowchart in FIG. 28 is finished.

In the present example embodiment, signal light from a non-communication object is diffracted in a direction different from the light receiver because a light transmission direction and a light reception direction of signal light are controlled by use of a phase modulation type spatial light modulation element. Thus, according to the present example embodiment, it is possible to prevent interference of signal light by identifying an object on a receiving side of signal light, and constructing an environment for communication with a communication object.

In general, when communicating with a plurality of mobile bodies by use of light, it becomes impossible in some cases to communicate due to interference by projected light of other mobile bodies. In order to solve this problem, there is a method of multiplexing by time division. In the method of multiplexing by time division, it is only necessary to switch communication objects at regular time intervals and then perform communication in order. However, it is difficult to apply, to a communication environment in which an unspecified number of mobile bodies are present, the method of multiplexing by time division without using the technique according to the present example embodiment, because an environment in which a plurality of mobile bodies can intercommunicate needs to be constructed and controlled in such a way that all the mobile bodies share the environment.

In the present example embodiment, control combining spatial multiplexing and time multiplexing is enabled by controlling, on a receiving side, diffraction directions of light received from a communication object and a non-communication object. As a result, according to the present example embodiment, it is possible to prevent signal light from interfering with one another among a plurality of objects. Moreover, according to the present example embodiment, it is possible to achieve multicasting which simultaneously transmits signal light to a plurality of communication objects by transmitting signal light in a space-division manner.

While the present invention has been described above with reference to the example embodiments, the present invention is not limited to the example embodiments described above. Various alterations that can be appreciated by a person skilled in the art can be made to a configuration and details of the present invention within the scope of the present invention.

[Supplementary Notes]

Some or all of the example embodiments described above may also be described as the following Supplementary notes, but are not limited to the followings.

(Supplementary Note 1)

An inter-mobile-body communication system including:
   a control device which performs control that switches between a first mode of transmitting wide-area signal light, and a second mode of transmitting selective signal light toward a communication object in response to response signal light responding to the wide-area signal light transmitted in the first mode, and performs control of selectively receiving the response signal light from the communication object; and
   a light transmitting/receiving device which transmits the wide-area signal light in the first mode, transmits the selective signal light toward the communication object in the second mode, and selectively receives the response signal light from the communication object, according to control by the control device.

(Supplementary Note 2)

The inter-mobile-body communication system according to Supplementary note 1, wherein
the light transmitting/receiving device includes a light source, a light receiver, and a phase modulation type spatial light modulation element, transmits the wide-area signal light and the selective signal light formed by light resulting from reflection of emanation light from the light source by a display unit of the spatial light modulation element, and selectively receives the response signal light from the communication object by reflecting the response signal light toward the light receiver by the display unit of the spatial light modulation element, and
the control device sets emission shapes and light transmission directions of the transmitted wide-area signal light and selective signal light by controlling a pattern displayed on the display unit of the spatial light modulation element, and selects the response signal light received by the light receiver.

(Supplementary Note 3)

The inter-mobile-body communication system according to Supplementary note 1 or 2, wherein
the control device performs control that changes emission shapes of the transmitted wide-area signal light and selective signal light depending on a distance to the communication object, and
the light transmitting/receiving device transmits the wide-area signal light and the selective signal light having emission shapes corresponding to control by the control device.

(Supplementary Note 4)

The inter-mobile-body communication system according to any one of Supplementary notes 1 to 3, wherein
the control device performs control that changes emission shapes of the transmitted wide-area signal light and selective signal light in accordance with a movement direction of the communication object, and
the light transmitting/receiving device transmits the wide-area signal light and the selective signal light having emission shapes corresponding to control by the control device.

(Supplementary Note 5)

The inter-mobile-body communication system according to any one of Supplementary notes 1 to 4, wherein
the control device performs control that changes emission shapes of the transmitted wide-area signal light and selective signal light depending on a speed difference relative to the communication object, and
the light transmitting/receiving device transmits the wide-area signal light and the selective signal light having emission shapes corresponding to control by the control device.

(Supplementary Note 6)

The inter-mobile-body communication system according to any one of Supplementary notes 1 to 5, wherein
the control device searches for the communication object by the first mode when the response signal light from the communication object being in communication becomes untrackable by the second mode.

(Supplementary Note 7)

The inter-mobile-body communication system according to any one of Supplementary notes 2 to 6, wherein
the control device performs control in such a way as to guide the response signal light from the communication object toward the light receiver, and guide the response signal light from a non-communication object out of the light receiver.

(Supplementary Note 8)

The inter-mobile-body communication system according to Supplementary note 7, wherein
the control device performs control in such a way as to guide the response signal light from the communication object toward the light receiver, and guide the response signal light from the non-communication object out of the light receiver when the response signal light is received from a plurality of objects.

(Supplementary Note 9)

The inter-mobile-body communication system according to Supplementary note 7 or 8, wherein
the control device permits communication by guiding the selected response signal light from the communication object to the light receiver, and rejects the response signal light from the communication object for which communication is not permitted by guiding the response signal light out of the light receiver, thereby switching the communication object for which communication is permitted at any timing, in a period of selecting any one of the plurality of communication objects when communicating with the plurality of communication objects.

(Supplementary Note 10)

The inter-mobile-body communication system according to any one of Supplementary notes 7 to 9, wherein
the control device performs control that transmits the selective signal light toward each of the plurality of communication objects, when transmitting the selective signal light to the plurality of communication objects.

(Supplementary Note 11)

An inter-mobile-body communication method including:

performing control that switches between a first mode of transmitting wide-area signal light, and a second mode of transmitting selective signal light toward a communication object in response to response signal light responding to the wide-area signal light transmitted in the first mode;

transmitting the wide-area signal light in the first mode;

transmitting the selective signal light toward the communication object in the second mode; and selectively receiving the response signal light from the communication object.

(Supplementary Note 12)

A program recording medium recording an inter-mobile-body communication program, causing a computer to execute:

processing of performing control that switches between a first mode of transmitting wide-area signal light, and a second mode of transmitting selective signal light toward a communication object in response to response signal light responding to the wide-area signal light transmitted in the first mode;

processing of transmitting the wide-area signal light in the first mode;

processing of transmitting the selective signal light toward the communication object in the second mode; and processing of selectively receiving the response signal light from the communication object.

This application is based upon and claims the benefit of priority from Japanese Patent Application No. 2016-65876, filed on Mar. 29, 2016, the disclosure of which is incorporated herein in its entirety by reference.

REFERENCE SIGNS LIST

1 Inter-mobile-body communication system
10 Light transmitting/receiving device
11 Input/output circuit
12 Light transmitter/receiver
13 Light transmission/reception setting unit
14 Optical system
21 Light source
22 Light source driving unit
23 Light receiver
24 Light receiving circuit
31 Spatial light modulation element
32 Modulation element driving unit
50 Control device
51 Input/output circuit
52 Light transmission/reception control circuit
53 Light transmission setting circuit
54 Storage circuit
55 Communication setting circuit
56 Interface
57 Object identifying circuit
58 Light transmission position setting circuit
61 Object tracking circuit
62 Object selecting circuit
321 Receiving circuit
322 Frame memory
323 Timing generation circuit
324 Conversion circuit

What is claimed is:

1. An inter-mobile-body communication system comprising:

a control device configured to perform control of switching between a first mode of transmitting wide-area signal light, and a second mode of transmitting selective signal light toward a communication object in response to response signal light responding to the wide-area signal light transmitted in the first mode, and perform control of selectively receiving the response signal light from the communication object; and a light transmitting/receiving device configured to transmit the wide-area signal light in the first mode, transmit the selective signal light toward the communication object in the second mode, and selectively receive the response signal light from the communication object, according to control by the control device, wherein the light transmitting/receiving device is provided with a light source, a light receiver, and a phase modulation type spatial light modulation element, transmits the wide-area signal light and the selective signal light formed by light resulting from reflection of emanation light from the light source by a display unit of the spatial light modulation element, and selectively receives the response signal light from the communication object by reflecting the response signal light by the display unit of the spatial light modulation element, toward the light receiver, the control device is configured to:

set emission shapes and light transmission directions of the transmitted wide-area signal light and the transmitted selective signal light by controlling a pattern displayed on a display unit of the spatial light modulation element;

select the response signal light received by the light receiver, by performing control in such a way as to guide the response signal light from the communication object toward the light receiver, and guide the response signal light from a non-communication object out of the light receiver; and permit communication, in a period of selecting any one of a plurality of the communication objects when communicating with a plurality of the communication objects, thereby switching the communication object for which communication is permitted at any timing.

2. The inter-mobile-body communication system according to claim 1, wherein the control device performs control, when the response signal light is received from a plurality of objects, in such a way as to guide the response signal light from the communication object toward the light receiver, and guide the response signal light from the non-communication object out of the light receiver.

3. The inter-mobile-body communication system according to claim 1, wherein the control device rejects the response signal light from the communication object for which communication is not permitted by guiding the response signal light out of the light receiver.

4. The inter-mobile-body communication system according to claim 1, wherein the control device performs control of, when transmitting the selective signal light to a plurality of the communication objects, transmitting the selective signal light toward each of a plurality of the communication objects.

5. The inter-mobile-body communication system according to claim 1, wherein the control device performs control of changing emission shapes of the transmitted wide-area signal light and the transmitted selective signal light depending on a distance to the communication object, and the light transmitting/receiving device transmits the wide-area signal light and the selective signal light having emission shapes according to control by the control device.

6. The inter-mobile-body communication system according to claim 1, wherein
the control device performs control of changing emission shapes of the transmitted wide-area signal light and the transmitted selective signal light, according to a movement direction of the communication object, and
the light transmitting/receiving device transmits the wide-area signal light and the selective signal light having emission shapes according to control by the control device.

7. The inter-mobile-body communication system according to claim 1, wherein
the control device performs control of changing emission shapes of the transmitted wide-area signal light and the transmitted selective signal light depending on a speed difference relative to the communication object, and
the light transmitting/receiving device transmits the wide-area signal light and the selective signal light having emission shapes according to control by the control device.

8. The inter-mobile-body communication system according to claim 1, wherein
the control device searches for the communication object in the first mode when the response signal light from the communication object being in communication becomes untrackable in the second mode.

9. An inter-mobile-body communication method for controlling a light transmitting/receiving device that is provided with a light source, a light receiver, and a phase modulation type spatial light modulation element, the method comprising:
performing control of switching between a first mode of transmitting wide-area signal light, and a second mode of transmitting selective signal light toward a communication object in response to response signal light responding to the wide-area signal light transmitted in the first mode, by setting emission shapes and light transmission directions of the transmitted wide-area signal light and the transmitted selective signal light by controlling a pattern displayed on a display unit of the spatial light modulation element;
transmitting the wide-area signal light in the first mode;
transmitting the selective signal light toward the communication object in the second mode;
selectively receiving the response signal light from the communication object, by performing control in such a way as to guide the response signal light from the communication object toward the light receiver, and guide the response signal light from a non-communication object out of the light receiver; and
permitting communication, in a period of selecting any one of a plurality of the communication objects when communicating with a plurality of the communication objects, thereby switching the communication object for which communication is permitted at any timing, wherein
the light transmitting/receiving device transmits the wide-area signal light and the selective signal light formed by light resulting from reflection of emanation light from the light source by a display unit of the spatial light modulation element, and selectively receives the response signal light from the communication object by reflecting the response signal light by the display unit of the spatial light modulation element, toward the light receiver.

10. A non-transitory program recording medium recording an inter-mobile-body communication program for controlling a light transmitting/receiving device that is provided with a light source, a light receiver, and a phase modulation type spatial light modulation element, the program causing a computer to execute:
processing of performing control of switching between a first mode of transmitting wide-area signal light, and a second mode of transmitting selective signal light toward a communication object in response to response signal light responding to the wide-area signal light transmitted in the first mode, by setting emission shapes and light transmission directions of the transmitted wide-area signal light and the transmitted selective signal light by controlling a pattern displayed on a display unit of the spatial light modulation element;
processing of transmitting the wide-area signal light in the first mode;
processing of transmitting the selective signal light toward the communication object in the second mode;
processing of selectively receiving the response signal light from the communication object, by performing control in such a way as to guide the response signal light from the communication object toward the light receiver, and guide the response signal light from a non-communication object out of the light receiver; and
processing of permitting communication, in a period of selecting any one of a plurality of the communication objects when communicating with a plurality of the communication objects, thereby switching the communication object for which communication is permitted at any timing, wherein
the light transmitting/receiving device transmits the wide-area signal light and the selective signal light formed by light resulting from reflection of emanation light from the light source by a display unit of the spatial light modulation element, and selectively receives the response signal light from the communication object by reflecting the response signal light by the display unit of the spatial light modulation element, toward the light receiver.

* * * * *